US006650731B1

United States Patent
Steltner et al.

(10) Patent No.: US 6,650,731 B1
(45) Date of Patent: Nov. 18, 2003

(54) SIMULATOR FOR SIMULATING AN INTELLIGENT NETWORK

(75) Inventors: Frank Steltner, Gelsenkirchen (DE); Marian Trinkel, Hütgenwald (DE); Hans Dieter Fischer, Bochum (DE); Berthold Kröger, Haltern (DE); Fritz-Jürgen Reich, Bochum (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/423,954

(22) PCT Filed: Feb. 23, 1999

(86) PCT No.: PCT/EP99/01141

§ 371 (c)(1),
(2), (4) Date: Apr. 24, 2000

(87) PCT Pub. No.: WO99/48306

PCT Pub. Date: Sep. 23, 1999

(30) Foreign Application Priority Data

Mar. 16, 1998 (DE) .......................... 198 11 097

(51) Int. Cl.[7] .............................. H04M 3/22; H04M 7/00
(52) U.S. Cl. ................................ 379/15.01; 379/221.08
(58) Field of Search ........................... 379/219–221.12, 379/15.01–15.04, 26.01

(56) References Cited

U.S. PATENT DOCUMENTS

| 5,359,649 | A |   | 10/1994 | Rosu et al.      |          |
|-----------|---|---|---------|------------------|----------|
| 5,621,670 | A | * | 4/1997  | Maeda et al.     | 703/21   |
| 5,737,517 | A | * | 4/1998  | Kite et al.      | 714/38   |
| 5,787,147 | A | * | 7/1998  | Gundersen        | 379/10.03|
| 5,805,570 | A | * | 9/1998  | Fields et al.    | 370/241  |
| 5,923,730 | A | * | 7/1999  | Takaki           | 379/15.02|
| 5,940,472 | A | * | 8/1999  | Newman et al.    | 379/10.02|
| 5,982,852 | A | * | 11/1999 | Schwartz         | 379/29.02|
| 6,526,277 | B1| * | 2/2003  | Zicker et al.    | 455/426.2|

FOREIGN PATENT DOCUMENTS

EP    0 781 020    6/1997

OTHER PUBLICATIONS

Donald E. Smith, "Ensuring Robust Call Throughput and Fairness for SCP Overload Controls," IEEE/ACM Transactions on Networking, Bd. 3, Nr. 5, Oct. 1, 1995, pp. 538–548.

* cited by examiner

Primary Examiner—Ahmad F. Matar
Assistant Examiner—Hector Agdeppa
(74) Attorney, Agent, or Firm—Kenyon & Kenyon

(57) ABSTRACT

A simulator for simulating the performance of an intelligent is described. The simulator includes.

a module for simulating any IN-typical event sequences (traffic simulator) according to the rules of traffic theory, and a module for the event-oriented simulation of the service control point (SCP simulator) using process models, The simulator also includes.

an arrangement for exchanging data between the modules;

an arrangement entering and storing the network configuration, communication service specification, and other simulation parameters, and for transferring them to the correct modules;

and an arrangement outputting and/or storing the simulated data.

Modules are also provided for simulating the SS7 signaling system, taking into account the functionalities of service relay points SRP and overload protection mechanisms within the IN. The simulation modules communicate in a file mode using transfer files or are linked in an online mode by a shared organization program: the online simulator. Event calendars in which events to be processed by the simulation modules are entered in their processing order and enable the processes running parallel in a real situation to be converted to sequentially executed processes are central elements of the simulator in online mode. The IN simulator can determine the performance of an IN in a present and a future configuration, thereby locating weak points and increasing IN efficiency.

31 Claims, 27 Drawing Sheets

| Traffic Configuration | | | | | | |
|---|---|---|---|---|---|---|
| Service parameter | | | | | | |
| Parameter | FPH | TIS | UNU | FPHL | NVK | TVS |
| Average call duration | 10 | 10 | 10 | X | 10 | 10 |
| Average recorded announcement duration | 10 | 100 | 10 | X | X | 10 |
| Max. recorded announcement duration | 150 | 150 | 150 | X | X | 15 |
| No. of attendant consoles | 50 | 40 | 500 | X | X | 50 |
| Announcement probability | 0 | 0 | 0 | X | X | X |
| Rerouting probability | 0 | 0 | 0 | X | X | X |
| Probability or rerouting due to "subscriber busy" | 0 | 0 | 0 | X | X | X |
| Televotum parameters | | | | | | |
| Parameter | tv1 | tv2 | tv3 | tv4 | tv5 | tv6 |
| SSP1 destination value | 1 | 1 | - | - | - | - |
| SSP2 destination value | 1 | 0 | - | - | - | - |
| No. of dest. val. to connection | 1000 | 0 | - | - | - | - |
| Start time | 0 | 0 | - | - | - | - |
| Stop time | 1000 | 1000 | - | - | - | - |
| Stop time for follow-up call | 1000 | 1000 | - | - | - | - |
| Time to timeout : 10 sec. | | | | | | |
| Rerouting time delay : 0 sec. | | | | | | |
| Average recorded announcement duration for "TV inactive" : 5 sec | | | | | | |
| Max. recorded announcement duration for "TV inactive": 15 sec | | | | | | |
| Number of attendant consoles for "TV inactive" : 10 sec. | | | | | | |
| Number of lines to SSPs : 3000 | | | | | | |
| Number of lines from SSPs : 3000 | | | | | | |
| Number of lines for FPHL : 50 | | | | | | |
| Average wait time (A party) : 10 sec. | | | | | | |
| Probability of follow-up call : 0 | | | | | | |
| Max. number of follow-up calls : 0 | | | | | | |

*Fig. 6*

| SCP Process Table |||||
|---|---|---|---|
| Process ID | Time/msec. | Priority | Name |
| 0 | 0.8 | 200 | MULTILAN |
| 1 | 1.525 | 190 | STINE |
| 2 | 0.875 | 176 | Memmgre GetMem |
| 3 | 90 | 138 | SERV1 Validate TCAP |
| 4 | 0.25 | 175 | ContextM Create Context |
| 5 | 0.1 | 176 | Memmgre Get RT |
| 6 | 10 | 138 | SERV1 Convert |
| 7 | 0.275 | 175 | ContextM Save Context |
| 8 | 1.4 | 166 | MDPFFWE |
| 9 | 90 | 138 | SERV1 Build Reply |
| 10 | 2.075 | 189 | STOUT |
| 11 | 0.25 | 176 | Memmgre FreeMem |
| 12 | 1 | 176 | Memmgre WriteCallTicket |
| 13 | 0.1 | 175 | CTXMME ReleaseContext |
| 14 | 0.1 | 175 | RCPRO |
| SCP Service Run |||||
| Service | Message | CPU | Process Sequence |
| 3-6 | 1 | 1-12 | 0 1 2 3 4 5 6 7 9 10 0 |
| 3-6 | 2 | 1-12 | 0 1 2 3 4 5 6 7 9 10 0 |
| 3-6 | 3 | 1-12 | 0 1 2 3 4 12 9 10 0 13 |
| 10-99 | 1 | 1-12 | 0 1 2 3 4 5 6 14 7 9 10 0 11 |
| 10-99 | 3 | 1-12 | 0 1 2 3 4 12 9 10 0 13 11 |
| ST2000 delay: 1 msec ||||
| TV CounterLimit: 30000 ||||

*Fig. 11*

| SS7 Process Time |||||
|---|---|---|---|---|
| TCAP Processor (SSP) |||||
| ISM<br>1 | CCO<br>1 | DHA<br>1 | | TSL<br>1 |
| SCCP Processor (SSP) |||||
| SCLCR<br>1 | SCLCT<br>1 | SCRCR<br>1 | | SCRCT<br>1 |
| MTP3 Processor (SSP) |||||
| HMRT<br>1 | HMDT<br>1 | HMDC<br>1 | | |
| MTP3 Processor (STP) |||||
| HMRT<br>1 | HMDT<br>1 | HMDC<br>1 | | |
| TCAP Processor (SCP) |||||
| ISM<br>0.5 | CCO<br>0.5 | DHA<br>0.5 | | TSL<br>0.5 |
| SCCP Processor (SCP) |||||
| SCLCR<br>1 | SCLCT<br>1 | SCRCR<br>1 | | SCRCT<br>1 |
| MTP3 Processor (SCP) |||||
| HMRT<br>1 | HMDT<br>1 | HMDC<br>1 | | |
| Number of STPs: 2 |||||
| Number of links between SSP and STP: 6 |||||
| Delay between SSP and STP: 1 msec |||||
| Number of links between STP and SCP: 12 |||||
| Delay between STP and SCP: 1 msec |||||
| Delay between the processors: 0.5 msec |||||
| Message length: 75 bytes |||||

Fig. 18

SIMULATOR FOR SIMULATING AN INTELLIGENT NETWORK

FIELD OF THE INVENTION

The present invention relates to a simulator for simulating an intelligent network, in particular for locating and analyzing weak points, testing network configurations and/or control mechanisms, and determining ways to increase the network's performance.

BACKGROUND INFORMATION

All over the world, the term intelligent network (IN) is used to describe a network architecture that applies to all telecommunication networks. At the heart of this concept is an individual, software-defined communication profile for customers of telecommunication services. The IN combines important functions and data in a central location and provides them in only one or just a few nodes. These functions and data include, for example, information on how a call with an IN-specific telephone number is to be handled depending on its place of origin, the phone number dialed, the time or day, and/or other parameters, e.g., whether and to which network subscribers a call is to be forwarded, whether and to which recorded announcements a call is to be switched, or whether a call is merely counted. The intelligent network provides an intelligent, distributed database access capability from a plurality of service switching points (SSPs) to data and functions stored in one or just a few service control points (SCPs) for the purpose of controlling the service.

From an organizational standpoint, the intelligent network is a centralized network above a telephone network and provides the intelligence for setting up and releasing calls conducted over the telephone network. The interface between the telephone network and the intelligent network is formed by the SSPs, where calls with IN-specific telephone numbers arrive and, after receiving the processing information from the SCP, are processed according to these instructions, e.g., they are forwarded to a telephone number provided by the SCP.

The individual function complexes are implemented on separate system levels within the intelligent network. IN transport and switching functions are implemented on the service switching point (SSP) level, service control and service data management functions on the service control point (SCP) level, and service management functions in the service management system (SMS). The SSP and SCP levels communicate via the signaling system No. 7 (SS7) over which IN-specific messages are sent for call handling purposes. Signaling transfer and control within the SS7 system are handled by one or more service transfer or service relay points (STP and SRP). The STP or SRP is used to switch and distribute (route) messages on the central signaling channel between the SCP and SSP. The STP or SRP can also serve as a gateway for messages that affect the IN services of a different carrier and must be processed by the SCP in a different IN. An important routing criterion of an IN message is its global title; the STP/SRP level carries out the global title translation (GTT) function.

The SSP level has mechanisms for detecting IN calls, e.g., based on the telephone number, and for supporting these calls. In the case of these calls, an SCP has to be interrogated to obtain information needed to continue setting up the call. The SCP contains programs and corresponding data for controlling the services. In addition, the SCP collects data for billing purposes and statistical analyses. Multiple SSPs access one central SCP. The SCP is subordinate to the service management system, which administers the IN services and IN components.

An intelligent network can be used to implement the following IN services, among other things:

Televoting (televotum) (TV): the televoting service enables the service subscriber to record the number of calls placed to is televoting number. According to one version of this service, the SCP is interrogated each time a call is made, while in another version the calls are pre-counted in the SSP, with the SCP being interrogated only after k number of calls have been processed. Regardless of the version selected, each TV call arriving in the IN system is recorded. In addition, each nth call can be handled in a special way depending on the active traffic routing program, e.g., forwarded to a destination address defined by the service subscriber after being recorded. All other calls are transferred, after being recorded, to a recorded announcement which was also defined in the service subscriber's traffic routing program.

Freephone (FPH): the freephone service allows service users to place a toll-free call to the "service subscriber". The service subscriber pays all charges.

Universal number (UNU): the universal telephone number service enables callers to reach a service subscriber under a standard, local network-independent telephone number regardless of his present location. The charges for calls of this type may be assigned to the caller only or shared between the calling and called parties, depending on the option selected by the service subscriber.

Tele-info service (TIS): the tele-info service gives callers access to a range of information provided by the service subscriber by dialing the latter's recorded announcement equipment or through direct dialog. The charges are billed to the caller and can be shared between the carrier and service subscriber on the basis of the call-specific information.

Other services are also possible, such as assigning a telephone number to a customer instead of to a line and redirecting all calls made under this telephone number to the customer's present location. In this sense, mobile radio networks are also intelligent networks.

The service subscriber has the option of specifying his service based on additional service features, including:

Rerouting: if the dialed subscriber does not answer or the line is busy, the call is either switched to a recorded announcement or another number. This procedure can be repeated up to a preset number of attempts, after which the call is rejected.

Call limit: if the number of calls to a destination number exceeds the limit defined by the service subscriber within a certain period of time, the excess calls are routed to defined alternative destination numbers or recorded announcements.

Time-dependent destination control: the time of the call is compared to the periodic and/or temporary time window. If no valid time window is found, the SCP transfers the IN call to a standard advisory message; otherwise it branches to the call destination or to the next feature.

Origin-dependent destination control: the network origin information is compared to the origin information stored in the traffic routing program. If no match is found, the SCP transfers the call to a standard advisory message; otherwise it branches to the call destination or to the next feature.

Call distribution: the call distribution feature enables users to define individual quotas according to which calls are distributed to different destinations.

If a call is switched to a recorded announcement, the SSP acts like a fictitious communication party. The SSP supports network service-specific standard advisory messages and recorded announcements that can be controlled as call destinations. The individual recorded announcements have a limited number of attendant consoles. If all attendant consoles are busy, the excess calls are rejected. Each message is limited by a maximum playback time and number of repetitions.

For most of the IN services, e.g., FPH, UNU, TIS, and TV without the pre-counting function, the function of the intelligent network is to translate the dialed IN number to a real number as a function of defined service parameters in the traffic routing program. This is done according to the following main sequence:

1. The SSP evaluates the first few digits in the dialed telephone number and detects the IN service. The SSP sends a PROVIDE INSTRUCTION message to the SCP asking how this call is to be handled. The message contains the IN subscriber number dialed by the service user (CALLED PARTY ADDRESS) and the caller's telephone number (CALLING PARTY ADDRESS) as parameters.
2. In the SCP, the PROVIDE INSTRUCTION message accesses the service logic program for the corresponding IN service. The subscriber-specific traffic routing program addressed by the CALLED PARTY ADDRESS is activated. In the procedure described here, the result of this is to determine a destination for setting up the call, which can be either a telephone number or a recorded announcement. In addition, the traffic routing program can provide requests for monitoring the call, such as monitoring of "subscriber busy" and "subscriber does not answer". The SCP saves the results in a call-specific context and sends the CREATE-JOIN and MONITOR messages to the SSP. The message contains the CALLED PARTY ADDRESS and EVENT LIST, which specifies the events to be monitored, as parameters.
3. The SSP sets up a call to the B party over the telephone network using the destination number transferred in the CREATE-JOIN parameter or switches the call to a recorded announcement.
4. The SSP monitors the call setup procedure to the B party, if this was specified in the EVENT LIST. If the B party does not respond, the call placed to the B party is released at the and of a timeout, and the SCP is notified of the event via the EVENT message.
5. The traffic routing program defines an alternative (rerouting) destination and sends a CREATE-JOIN and MONITOR message containing the appropriate parameters to the SSP.
6. The SSP sets up a call to the B party over the telephone network using the destination number transferred in the CREATE-JOIN parameter or switches the call to a recorded announcement. When the B party answers, the call is put through.
7. At the end of the call, the SSP collects the call charge and statistic data needed in the SCP and transfers it in the EVENT(CALL END) message. In the SSP, a timer monitors confirmation of this message by the SCP. If no confirmation arrives before the timer expires, the EVENT (CALL END) message is sent again.
8. After receiving the EVENT(CALL END) message, the SCP sends a message to end the TCAP dialog. The SCP reactivates the call-specific context. The received time stamps are saved along with the data stored in the context (call tickets). They are transferred to the SMS later on for further processing. Counters maintained in the SCP (e.g., for successful call attempts) are incremented (counter tickets).

Points 4, 5, and 6 of this sequence occur only when a call is rerouted.

To ensure that the IN continues to operate properly even with a high traffic volume, overload protection mechanisms are provided in the IN. The overload protection mechanism causes the SSP to reject IN calls without first interrogating the SCP according to certain criteria. Examples of overload protection mechanisms include AUTOMATIC CALL GAPPING (ACG) and the LEAKY BUCKET method. Overload protection can be based on services and/or destinations.

A service control point is usually a multi-layer system with a hardware base and multiple software layers (usually three). The hardware base includes a computer with one or more parallel processors as well as trunks, hard disks, magnetic tapes, terminals, and printers. The first software layer contains the system software. The second software layer (NODE software) contains general functions for the service application. The third software layer provides the application that supports the call-processing services. If the SCP has a parallel-processing architecture, it includes a plurality of processors, each of which forms a self-contained unit with a CPU, main memory, power supply unit, and input/output processor and is connected to the others by a bus system.

The various SCP software layers include operating system processes and general processes that do not belong directly to the operating system, such as those for communication between the processes or for efficient local cache management, as well as application processes which are needed for processing an IN message. An IN message arriving at the SCP thus passes through a sequence of processes in various SCP layers, resulting in the generation of an IN message sent by the SCP to the SSP in response to the SSP's request for call handling instructions. The processes can be service- and/or service subscriber-dependent or they can be used independently of the service or subscriber in all IN messages. The processes are implemented in one or more incarnations on all or only selected processors in an SCP.

An IN message is generally processed by the SCP according to the following scheme, implemented by calling up a preset chain of individual processes:

A message from the SSP is received and forwarded to the SCP computer. The SCP computer receives the messages, provides storage space, and checks the message to determine its validity range. The call handling context is drawn up. A routing tree is loaded from the working memory or from the hard disk. The telephone number to be dialed is selected from the routing tree. The context to place the call is stored and a reply to the SSP is prepared. The reply is sent to the SSP in the form of a new IN message.

All processes needed to process an IN call are activated on only one processor, and the preceding process must be terminated before the next process can begin.

The end-of-call handling after the caller has released the call from the exchange to the SPP is processed in the same manner as the call setup handling described above using a corresponding process chain.

An IN message in the STP/SRP is also processed by processing a predetermined chain of consecutive processes.

Long average processing times have been observed during measurements conducted in existing IN networks, in particular on their central component (the SCP). This leads to unacceptably long call setup times when the system is heavily loaded by IN traffic, in particular during peak hours involving the televoting service, but also as a result of other influences. However, it is difficult to analyze weak points in the IN network which could lead to such long response times, since the measured values are merely statistical data and a measurement cannot be conducted during each stage of message processing. In addition, conducting measurements in real INs poses a fundamental problem in that all real detailed measurements influence the performance of the system to be investigated by activating additional measurement processes that are not part of the regular IN call handling functions.

A further problem arises when implementing new components in an existing IN. The IN is in operation at each point in time, making it impossible to change parameters in this complex system without jeopardizing operating reliability. It is also not presently possible to determine whether, for example, processors having a certain technical specification actually achieve the performance levels promised by the manufacturer.

In addition to the need to analyze weak points in existing intelligent networks, there is also a need to test as yet unimplemented network configurations as early as the planning stage so as to determine the configuration that has the best performance under given basic conditions. For example, the question arises as to how powerful the SCP or its individual processors must be or what capacities must be provided, and possibly in what form, for the individual services. The question also arises as to whether and how better performance can be achieved, possibly by changing the process management functions within the IN processors. A further critical element in operating an intelligent network is the overload protection mechanism which is supposed to stabilize the system as closely as possible to its performance limit. In practice, corresponding overload protection parameters can be determined only with great difficulty, which means there is a need to determine the optimum overload protection settings as a function of other network configurations and independently of network operation and to transfer them to the real network.

SUMMARY

An object of the present invention is therefore to provide a tool for measuring the performance of a communication network with an IN structure. In doing this, the user should be able to set and change a wide range of network configurations and call handling methods within the network components, i.e., the simulation must be independent of the selected IN platform. Statistical data on network performance must be generated which can be compared to data measured by real IN components; however, data which cannot be accessed in real networks should also be provided, for example call-specific logging of the processing times as the call passes through the intelligent network.

This object is achieved according to the present invention with a simulator for simulating the performance of an intelligent network (IN) having the following components:

1. a module for simulating any IN-typical event sequences (traffic simulator) according to the rules of traffic theory;
2. a module for the event-oriented simulation of the service control point (SCP simulator) using process models;
3. means for exchanging data between the modules;
4. means for entering and storing the network configuration, communication service specification, and other simulation parameters, and for transferring them to the correct modules;
5. means for outputting and/or storing the simulated data.

Because the reasons for the performance shortcomings in the intelligent network can frequently be found in the central SCP, due to the network's centralized structure, the SCP model forms the heart of the simulator. Queue modules and process models make it possible to create a detailed model of the SCP software structure. A further module, the traffic simulator, is needed in the IN simulator to generate an IN-specific load and to produce realistic input for the SCP simulator.

The simulator is implemented at the core by a computer program. At startup, or during simulation, this program accesses files in which are stored parameters for configuring the network or the network components, for specifying the communication services, i.e., the type and sequence of call handling functions, and other parameters that affect the simulation run, such as information about the traffic volume. The user can write and change these files in the usual manner. The simulation parameters are preferably entered using a computer monitor and keyboard. The simulation parameters are stored and can be modified individually or in their entirety prior to running a new simulation, making it possible to selectively analyze the influence of individual parameters on the simulated IN performance.

The simulation method used is an event-controlled simulation. IN-specific events, which pass through the individual simulator components for processing, are generated at specific points in time. The processing times that arise in the individual simulation modules, and possibly also in subcomponents of the simulation modules, are also logged. In addition to the basic components of SCP simulator and traffic simulator, the IN simulator preferably also has a module for the event-oriented simulation of the signaling system No. 7. This SS7 simulator operates on the basis of queue models to the extent that functionalities in the SS7-integrated processors are to be simulated, and/or provides a message with only one constant delay time that takes into account the finite runtime on the signaling channels between the SSP and the SCP. The components to be simulated by the SS7 simulator are the processors/process chains on the SSP level, the STP/SRP level, and, depending on the network configuration, the SCP level, e.g., an SCP input processor (FRONT-END SYSTEM) which forms the interface between the SCP and the signaling system.

In a further advantageous embodiment of the present invention, a module for simulating overload protection mechanisms is provided. This overload protection simulator modifies the number of events processed by at least one of the other simulation modules as a function of the load on one or more simulation modules, e.g., as a function of the queue length, and/or as a function of user-definable parameters. The user-definable parameters can include, for example, load tolerance limits which, when exceeded, activate the overload protection mechanism. Instead of permanently defined limits, a "fuzzy" determination can also be provided, e.g., using fuzzy logic. An overload protection simulator that receives its control parameters from the SCP simulator, accesses the traffic simulator, and regulates the number of IN events generated or forwarded by the traffic simulator as a function of the control parameters comes closest to simulating real events. After manipulating the overload protection mechanism, there is a certain probability that a call which was first generated by the traffic simulator will not be transformed into an IN event corresponding to a request from the SSP to the SCP, and is therefore not passed on to the other simulation modules. In reality, this is a call that is rejected by the SSP.

The overload protection simulator advantageously simulates the Automatic Call Gapping (ACG) mechanism. In this case, all calls or events exceeding a certain number are rejected within a certain interval.

The traffic simulator, SCP simulator, and possibly the SS7 simulator and overload protection simulator modules are separate simulators of the corresponding network components. Internally, their functions are either linked by files (file mode) or preferably integrated by an organization program (online mode) which processes the individual IN events across all components of the IN simulator.

In file mode, the simulation modules communicate with each other by performing read and write access to files in which the data relating to the network configuration or network components to be simulated, and possibly the data generated by one of the simulation modules, is stored.

To carry out a full network simulation, the partial simulations are invoked consecutively. A simulation run begins when the traffic simulator generates the traffic volume in the IN. The generated messages (PROVIDE INSTRUCTION, with its generation time t1, EVENT or CALL END) are stored in a first transfer file and read in by the simulation module, which is subsequently invoked. A call identification number, which enables multiple messages to be assigned to the same call and thus, in the end, to determine call-specific response times, is also stored for each message. In the simplest simulator version, this second simulation module is the SCP simulator. Taking the SS7 into account, the first file is then transferred to the SS7 simulator. In this case, SS7 output time t2 is added to the messages after the latter pass through the SS7 simulator, and the messages are written to a second transfer file that is accessed by the SCP simulator. The SCP simulator generates a CREATE-JOIN or CALL END message for each of the entries present in the file transferred to the simulator and writes the message, together with output time t3, to a third file. Before the message arrives at the SSP, the SS7 simulator is run once again, logging SS7 output time t4.

By determining the difference between the logged time stamps, the delay times in the individual network components and in the overall network can be derived from the transfer files of the simulation modules.

Because the sequential operation of the partial simulations prevents any sort of feedback loop between the network components, the procedure described above is carried out multiple times to reach a steady state and largely simulate the functionalities of the real network.

File mode is highly suitable for studying the behavior of individual network components separately from the network, i.e., without feedback. The behavior of the individual components can be determined quickly and directly, for example by modifying the corresponding simulation parameters. The individual IN components can be modified and analyzed separately. File mode also enables all individual EVENTS between the components to be easily tracked. Due to the stationary behavior of the overall system, however, file mode allows only iterative determinations to be made, based on suitable initial conditions.

In online mode, an organization program ensures that the partial simulations run more or less in parallel. The simulator is thus able to simulate the network as a whole and, in particular, to take into account feedback between the components directly. Event calendars are used to convert the message processing operations in the network components, which run parallel in a real network, to sequential or quasi-parallel processing operations of the IN events in the simulation modules. An event calendar is a list of all events that are to be processed by one element, e.g., the simulator, a simulation module, or a sub-component of a module, e.g., IN messages or individual processes that are entered in this list in chronological order. The event calendar enables the online simulator to specify which event will be processed next (event-oriented simulation). The time at which the next event starts is derived additively from the starting time and duration of the preceding event. The global event calendar, which contains the events to be processed by all the simulation modules as a whole in chronological order, plays a central role in operating the simulation modules in quasi-parallel mode. On the basis of the global event calendar, the simulator specifies which partial simulation is to be invoked at which simulation time. In addition to the global event calendar, there are also local event calendars that are managed by the simulation modules. Events in the following event groups are entered in the global event calendar:

Internal events: internal events are references to the local calendars in the corresponding simulation modules. They affect how a simulation module progresses to the next simulation step.

External events: external events are the input of an IN message in a partial simulation; they represent messages that are exchanged between the simulation components and are used for communication between the simulation components.

Call-independent events: according to one embodiment of the present invention, events that are independent of the IN events and belong, for example, to the simulation of the operating systems in the sub-components, are also entered in the global calendar.

All events generally cause the respective simulation modules to generate a follow-up event which, in turn, is entered in the global event calendar and, in some circumstances, in the local event calendars as well. Some events, after being processed, trigger a logging operation on the basis of which the speed at which a message was processed by the corresponding simulation module can be determined.

The user can preferably access the functions of the IN simulator via a user interface. This interface administers one or more simulations by providing input screens for entering the simulation parameters of the individual simulation modules, stores the entered data in corresponding files, and saves it according to simulation. The user can generate a new simulation by copying and modifying selected parameters. The user interface includes a largely independent file management system for the system of configuration and event files belonging to each simulation. The user can display all simulated data. The "measured quantities" selected by the user, e.g., SCP utilization, queue length in the SCP, traffic volume in the IN, are prepared with the help of a graphic program and can be displayed in graphic form on a computer screen. The simulation results of one simulation as well as different simulations can advantageously be displayed together on the same screen. In addition, file filters can advantageously be used to generate output files for further processing the data in other programs.

BRIEF DESCRIPTION OF THE DRAWINGS

FIG. 6 shows one example of configuration parameters for the traffic simulator.

FIG. 11 shows an example of configuration parameters for the SCP simulator.

FIG. 18 shows an example of configuration parameters for the SS7 simulator.

DETAILED DESCRIPTION

Figure 1:
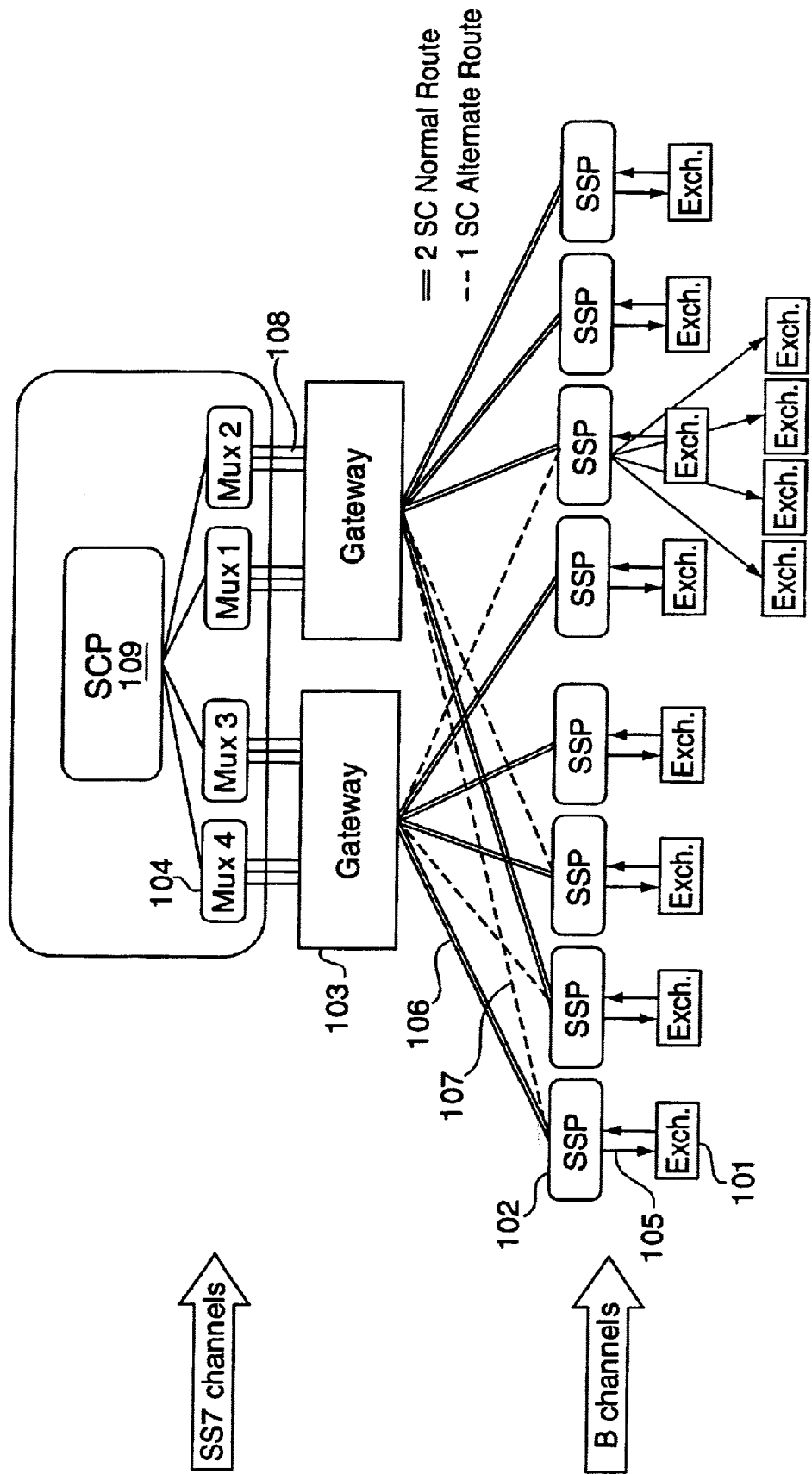
FIG. 1 shows the topology of an intelligent network.

FIG. 1 shows the topology of an intelligent network to illustrate the simulation concept. An intelligent network has three main logical components: a service control point (SCP) 109, a service switching point (SSP) 102, and a signal transfer point or signal relay point (STP or SRP) 103. The SSP level accepts signaling requests from the external customer devices via one of exchanges 101 in the telephone network and operates the call setup procedure for IN-specific connections of this type.

The SCP level includes procedures and databases for call evaluation and call management. This information is used to select a route for a call through the telephone network. The SCP or SRP performs switching functions between SCPs and SSPs. The SSP, SCP and STP/SRP components communicate with each other via the signaling system No. 7 (SS7). A plurality of signaling channels 106, 107, 108 usually exists between STP/SRP and SSP or STP for this purpose.

In principle, three logical components, SSP, SCP, and STP/SRP, can be integrated into one physical device, e.g., into an exchange. However, the pyramid structure of the intelligent network illustrated in FIG. 1, having a central SCP 109, a plurality of remote SSPs 102, and a few STPs/SRPs 103, which form the message nodes in the SS7 system, is usual. Physical B channels 105, over which telephone calls can be set up, exist between the exchanges in the telephone network and the SSPs. Generally, a call with an IN-specific telephone number is first switched to an SSP, which, after receiving the processing information from the SCP, forwards the call to its destination. The SSP thus forms the interface between the telephone network and the intelligent network. SSP functionalities can also be integrated directly into an exchange.

During the IN simulation, the traffic simulator simulates the IN traffic transferred from the SSPs to the intelligent network, the SCP simulator models the function of the SCP, and the SS7 simulator models the functions of the SSPs, STPs/SRPs, SCP input processors 104, and the trunks between these components. By making entries related to the network configuration, the simulator user can select any network topology, thus adjusting the structure of the simulated network to any requirements. The user-definable simulation parameters include the number of SSPs 102, the number of STPs/SRPs 103, the number of SCP input processors 104, the number of signaling channels between an STP/SRP and an SCP or an SSP, and possibly also the number of SCPs.

Figure 2:
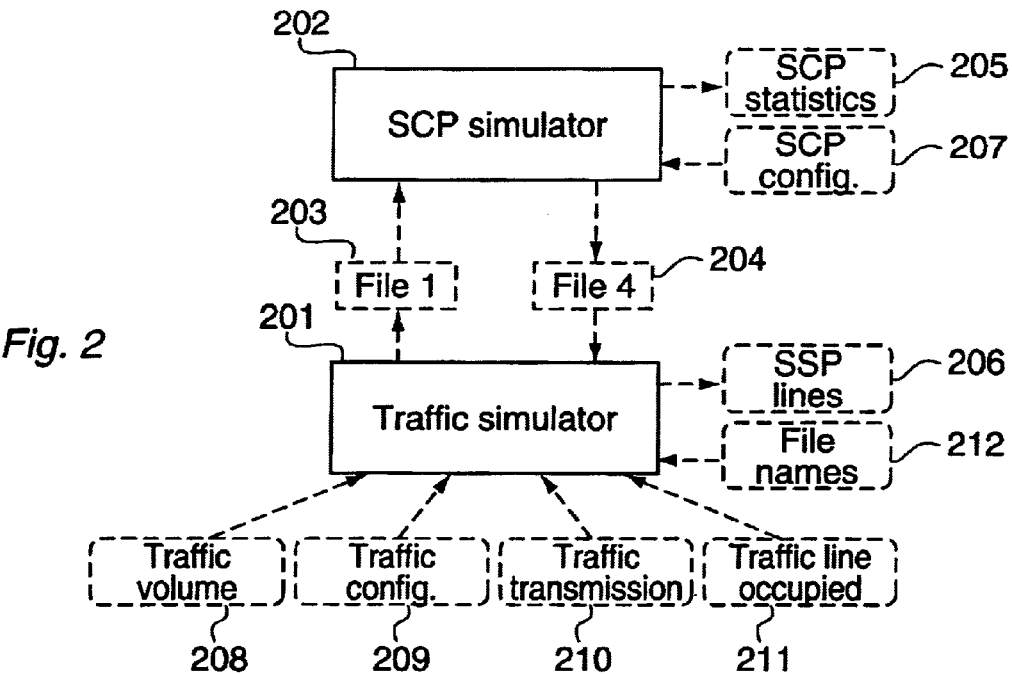
FIGS. 2 and 3 show the structure of a simulator according to the present invention, operating in file mode.

FIG. 2 shows the structure of an IN simulator according to the present invention and operating in file mode, including traffic simulator 201 and SCP simulator 202 modules. Depending on the user settings, which are stored in input files 208, 209, 210, 211, 212, traffic simulator 201 generates an IN-specific traffic volume, i.e., a sequence of events representing IN messages sent from one or more SSPs to the SCP, taking into account any data stored in transfer file 204. The user can preferably access input files 208 through 212 from a common user interface, and the files are read in by traffic simulator 201 at the start of the simulation. Input fields 208 through 212 contain parameters that each affect different aspects of the simulation, e.g., the network configuration in the area of the interface between the IN and telephone network (number of SSPs), the internal settings of an SSP (number of attendant consoles per service, time remaining to timeout, number of trunks), probabilities relating to the further progress of a call (average call and/or recorded announcement duration, maximum recorded announcement duration, rerouting probability), information on the average number of calls per time unit and service for one or more consecutive intervals. The fact that the number of input files 208 through 212 is random and, for example, all user input affecting other simulation modules can be stored in any number of files, including a single file, is self-evident.

In the example illustrated here, SCP simulator 202 has one SCP input file 207 in which user input relating to the SCP configuration is stored and which SCP simulator 202 reads in at the start of the simulation.

In file mode, traffic simulator module 201 and SCP simulator module 202 are activated consecutively. The sequence of events generated by the traffic simulator is written to a first transfer file 203, which contains the event sequences that are now to be processed by SCP simulator 202. In the next step, the SCP simulator reads in this transfer file 203 and processes the events stored therein. SCP simulator 202 enters the processed events in a second transfer file 204. The latter is returned to traffic simulator 201 during the simulation, but can also be provided directly to the evaluator, as can first transfer file 203.

The transfer files provide the contents of the event calendars of the particular receiving module. In transfer files 203, 204 are stored the data generated by traffic simulator 201 or SCP simulator 202 in the form of a data record which contains at least one time stamp indicating the time at which the corresponding message was generated in the traffic simulator or the SCP simulator as well as an identification number that allows two or more messages to be assigned to the same call. The difference between the two time stamps yields the time it takes for a message to be processed in the SCP. The simulator illustrated in FIG. 2 can thus be used to directly simulate the response of the SCP to a given traffic volume. This representation does not include signaling system No. 7.

Simulation modules 201, 202 also store statistical data in output files 205, 206, including data relating to processor utilization in the SCP, the queue length in the SCP, or trunk utilization to and from the SSP. The data recorded in these files is also available for further evaluation of the simulation results.

Figure 3:
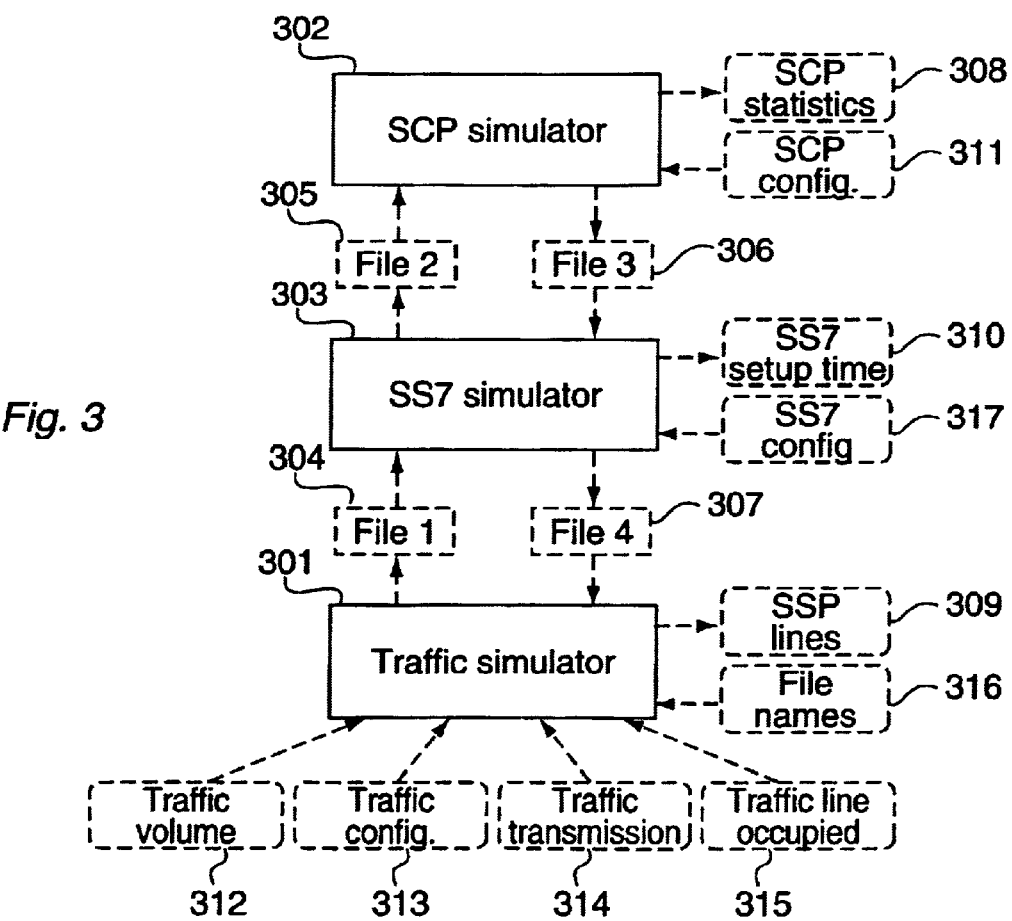

FIG. 3 shows the structure of a simulator according to the present invention and operating in file mode, including traffic simulator module 301, SS7 simulator module 303, and SCP simulator module 302. Compared to the simulator illustrated in FIG. 2, only SS7 simulator module 303 has been added to the simulator in FIG. 3. As a result, four transfer files 304, 305, 306, 307 are now exchanged between the modules during sequential processing of the partial simulations.

As described in the example above, the simulation of the intelligent network begins by generating an IN-specific traffic volume. To do this, traffic simulator 301 reads in input files 312 through 316, which correspond to files 208 through 212 in FIG. 2; transfer file 307, if provided, is also read in. The event sequence generated by traffic simulator 301 is stored in first transfer file 304. SS7 simulator 303 is invoked next. This simulator first reads in SS7 input file 317, in which is stored, for example, data relating to the configuration of the SS7 system. SS7 simulator 303 stores the event sequences it has processed in a second transfer file 305, which is read in by SCP simulator 302 after the latter has been invoked. The event sequences processed by SCP simulator 302 are then entered in a transfer file 306. To simulate the return of the IN messages from the SCP to the SSP, SS7 simulator 303 is reactivated and processes the event sequences stored in third transfer file 306, storing the results in fourth transfer file 307. If necessary, traffic simulator 301 is reactivated and the cycle from SS7 simulator to SCP simulator and back to SS7 simulator is repeated to simulate feedback loops between the network components. This iteration is repeated until the changes to the traffic data in one or more transfer files 304 through 307 (or 203, 204 above) have exceeded a limit that is acceptable to the user, thus bringing the system to the steady state.

Statistic data relating to individual simulation modules 301, 302, 303 is written to output files 309, 308, and 310. This data relates, for example, to SRP processor utilization or the number of lines occupied between the SRP and SCP or the SSPs during the SS7 simulation.

The data stored in the transfer files includes call-specific data records, each of which contains at least one time stamp. This time stamp is derived from the instantaneous simulation time when generating or processing the corresponding message in the various simulation modules. The processing times in each of the simulated network components can thus be calculated by determining the differences.

Figure 4:
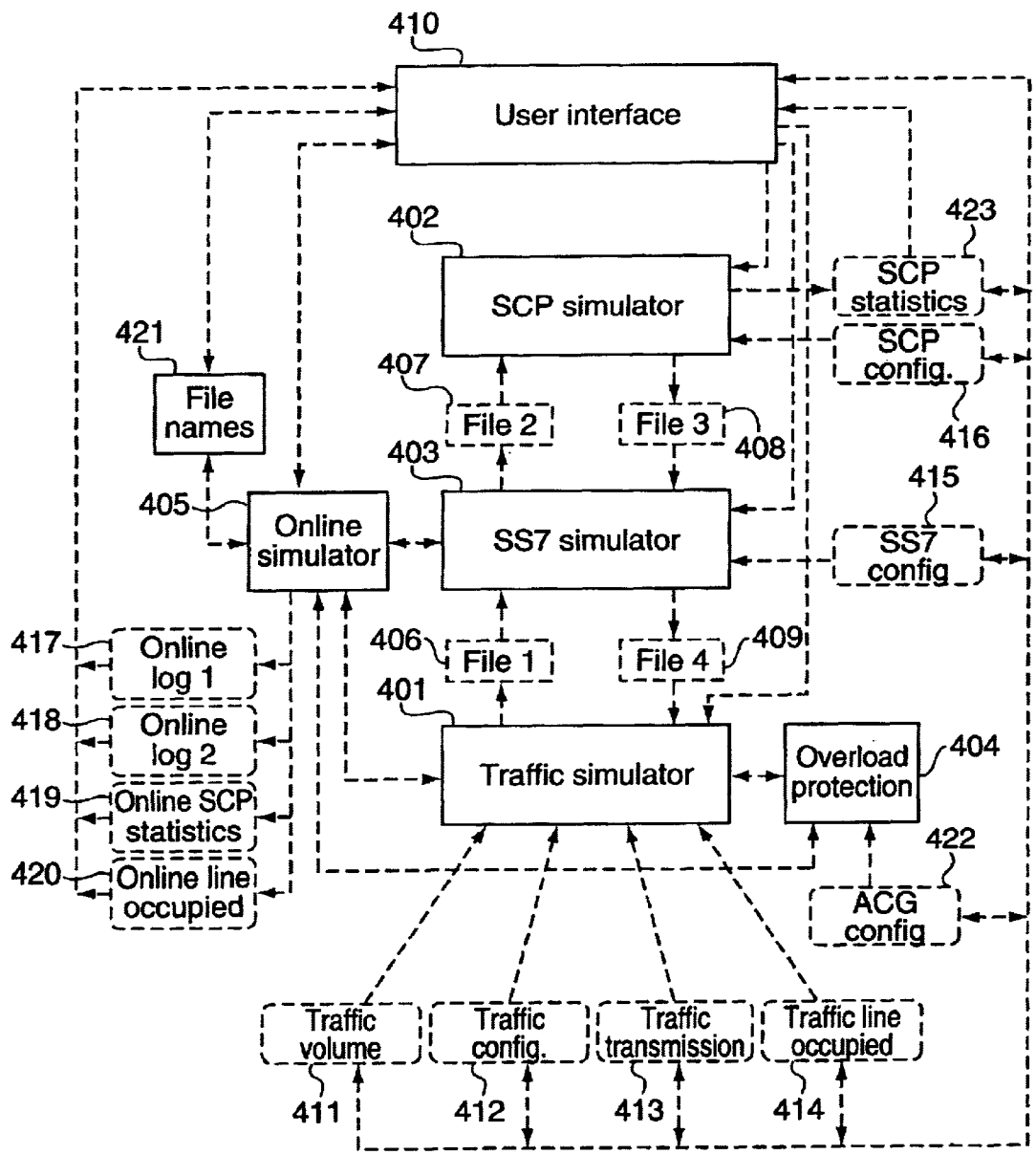
FIG. 4 shows the structure of a simulator according to the present invention that can operate in file or online mode.

FIG. 4 shows the structure of a simulator according to the present invention that can be operated in both file and online modes. The simulator has the simulation modules already described and illustrated in FIG. 3: traffic simulator 401, SS7 simulator 403, and SCP simulator 402. As described above, these components communicate via transfer files 406, 407, 408, 409.

Compared to the simulator illustrated in FIG. 3, the simulator shown here has one additional module, an overload protection simulator 404. This simulator regulates the event sequences generated or forwarded by traffic simulator 401 as a function of specific user-defined parameters, stored in file 424, and as a function of the load on the remaining simulation modules.

Simulation modules 401, 402, 403, and 404 are linked by a common organization program: online simulator 405. A user interface 410 is also provided which is connected directly to all components, i.e., the simulation modules, in one or both directions. Indirect connections also exist between the user interface and the simulation modules via files 411 through 414 (input files for traffic simulator 401), 415 (SS7 input file), 416, and 423 (SCP input/output file), 417 through 420 (output files for online simulator 405), which can be used to configure the modules and to output collected system data. As in FIGS. 2 and 3, the broken arrows in FIG. 4 represent file operations, while the solid arrows show a direct form of communication, e.g., a link formed by a common organization program. An arrow begins at the component which transfers parameters or messages to another simulation component.

The simulator illustrated in FIG. 4 can operate in file mode by invoking the individual simulation modules sequentially, as well as in online mode, in which case the simulation modules operate more or less in parallel.

The user interface is always linked to the traffic, SS7 and SCP simulators; each simulation is started from the user interface by transferring the respective simulation parameters. In file mode, subsystems are executed as independent programs after being invoked, i.e., independently of the user interface and without any interaction.

The bi-directional link between user interface 410 and online simulator 405 allows the simulator to be started by transferring the respective parameters and also enables "measured data" to be returned for output in graphic form during runtime (online mode). The user can also temporarily interrupt the simulation run or terminate it prematurely.

Simulation modules 401, 402, 403, and 404 are integrated by a programming system into online simulator 405, which controls the quasi-parallel execution of partial simulations by sending and receiving messages that are administered in the global event calendar. In online mode, therefore, all communication processes between traffic simulator module 401, SS7 simulator module 403, and SCP simulator module 402 take place via online simulator 405. Transfer files 406 through 409 are not used directly in online mode. However, they are used indirectly in the local event calendars.

Online simulator 405 initiates the entry of presettable logging quantities in log files 417, 418, 419, 420, e.g., time stamps t1 through t4 described above, SCP utilization, data relating to network utilization or the number of occupied lines. The data stored in these files can be output and viewed on the user interface in the known manner.

Because the overload protection mechanism regulates the traffic arriving in the IN via feedback loops, it is useful in most cases to simulate overload protection mechanisms only in online mode. In the simulator illustrated in FIG. 4, overload protection module 404 therefore does not have a direct link to SCP simulator 402, on the basis of whose load overload protection simulator 404 regulates the number of events generated by traffic simulator 401. SCP simulator 402 and overload protection simulator 404 are linked indirectly via online simulator 405 only in online mode.

Figure 5:
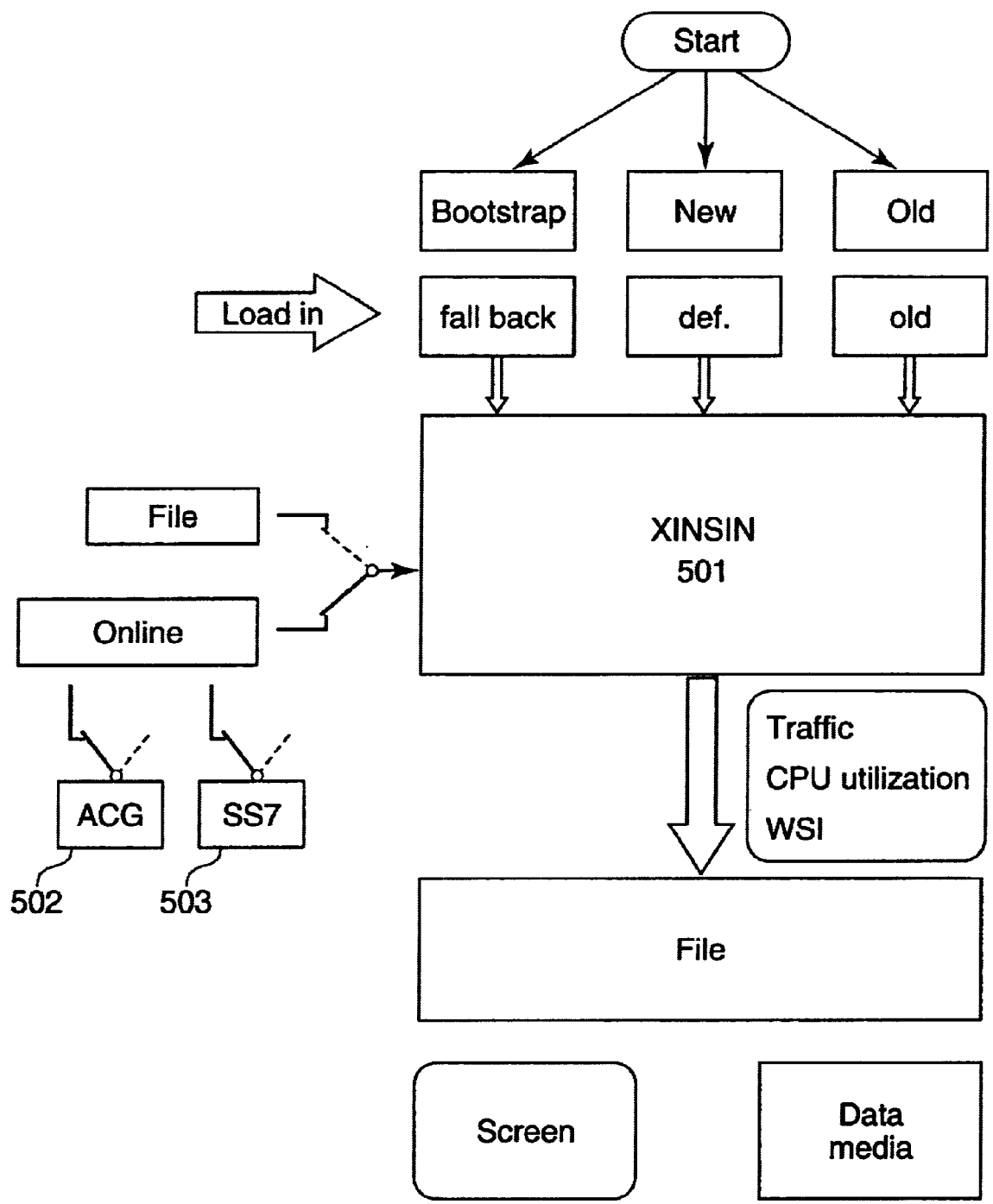
FIG. 5 shows a block diagram of an IN simulator.

FIG. 5 shows a block diagram of an IN simulation from the user's perspective. The simulation modules themselves are not shown, but rather are processed within black box 501. Overload protection simulator 502 and/or SS7 simulator 503 can each be activated or deactivated, with this action being represented by switches in FIG. 5. The user can also choose between file and online mode, with this action also being represented by a switch.

In addition to these settings, which relate to the simulator structure, the user can also define, after starting the simulator, the actual simulation parameters, i.e., the network configuration to be simulated, the traffic volume, etc. If bootstrapping is performed, the simulation modules re-read in all input files. However, it is also possible to selectively change individual parameters for generating a new simulation and to repeat passes of an earlier simulation. Based on predetermined or retrieved simulation parameters, simulator 501 then determines the preset output data, such as traffic, CPU utilization, queue length, as a function of the simulation time, and writes these parameters to files. The data can then be displayed on the screen or stored on data media and supplied to a further processing system.

FIG. 6 shows an example of configuration parameters for the traffic simulator as well as examples of numeric values for these parameters. The parameters listed in the table in FIG. 6 can be subdivided into service-specific parameters, which can be set separately for all services to be simulated, televoting parameters, which relate to the televoting service, and general parameters that apply to all services, i.e., to all calls generated by the traffic generator. The service-specific parameters can be set for the following IN services: freephone (FPH), tele-info service (TIS), universal number (UNU), IN-service FPHL, and televoting (TVS). Some of the parameters that can be set for the other services are not useful for the televoting service; these parameters are therefore marked with an X in the corresponding column. Ordinary telephone traffic (NVK) can also be included, since non-IN-specific calls also load the SSP in certain network configurations and can therefore contribute to IN utilization. The first service specific parameter (average call duration) is the only reasonable setting for NVK, since the remaining parameters relate to IN functions such as switching a call to a recorded announcement or rerouting a call.

The service-specific parameters include the average call duration, average recorded announcement duration, maximum recorded announcement duration, number of attendant consoles for recorded announcements and rerouting probability as well as for rerouting probability due to "subscriber busy". These parameters are needed to determine the probability of a follow-up event being generated at each simulation time, i.e., the probability of an EVENT or EVENT (CALL END) message being generated.

The televoting parameters can be entered separately for each televoting service subscriber TV1, TV2, etc. Only two service subscribers are active in the example shown here. The programmable parameters are: SSP1 or SSP2, number of destination values to connection, start time, stop time, and stop time for follow-up calls. The "destination value" parameter indicates the number of televoting calls that must be received by the specified SSP to generate a message for the SCP. If this parameter is set to 1, the televoting without precounting option is set; if the value is greater than 1, televoting with precounting in the SSP is set. The subsequent "number of destination values to connection" parameter indicates whether and after how many calls a connection is set up to the service subscriber. Because the televoting service is usually provided within strict time limits, the service start and stop times are also specified. The "stop time for follow-up calls" parameter indicates the time at which late TV calls are rerouted to an informative, possibly service subscriber-specific recorded announcement. The televoting parameters indicate the conditions under which a TV call generated by the traffic generator produces a first IN event.

The following general configuration parameters can also be set: The "time until timeout" parameter indicates how long the system must wait between transmission of an IN message to the SCP and failure to reply from the SCP before the SSP rejects the call. The "rerouting time delay" parameter indicates how long the system waits before rerouting a call. The "average and maximum recorded announcement duration for "TV inactive" parameter and the "number of attendant consoles" parameter for this recorded announcement specify how to handle incoming TV calls that arrive during times when the televoting service is inactive. The "number of lines to and from the SSPs" parameters relate to the network configuration in the area between the exchange and the SSP. The number of lines for the freephone service can also be specified. The "average waiting time for the A party" parameter indicates the average time interval after which the calling party hangs up if a call has not yet been set up. The following two parameters indicate the probability with which a follow-up call will be generated in the case of an unsuccessful call attempt and the maximum number of follow-up calls that are generated.

To generate an IN-specific combined traffic volume, not only are the parameters described above needed, which relate primarily to the generation of IN follow-up events (EVENT message), but also other parameters that define the basic conditions for generating corresponding IN initial events (PROVIDE INSTRUCTION). A step for entering the average traffic volume in terms of the number of calls per time unit is therefore provided. The average traffic volume can be changed at any user-defined points in time, remaining constant between these times. This makes it possible to generate time-dependent load curves of any shape, in particular peaks that are typical for the televoting service when services are properly assigned. The average traffic volume is entered for each IN service (FPH, TIS, UNU, FPHL, TV1, . . . , TVn) and for ordinary telephone traffic (NVK). If multiple SSPs are provided, the traffic volume is entered separately for each SSP, depending on the service. The number of SSPs is thus also a parameter that can be set for the traffic simulation.

A step-by-step variation over time is assumed for the traffic volume, with each step or each time interval preferably having the same time length. The number of intervals and the length of the intervals can be specified.

According to the rules of traffic theory, the probability of a call with a special service ID or service subscriber ID arriving at an SSP is determined for each simulation time or each simulation interval based on the above settings. The length of the simulation intervals is preferably much shorter than the length of the intervals for which the user specified an average traffic volume. The length of the simulation intervals preferably lies in the nanosecond range, while the traffic volume varies on a time scale of seconds, e.g., 10 to 100 seconds. The length of the simulation interval is preferably selected so that a total of one call is generated per interval, thus making it possible to list all generated calls in chronological order.

The instantaneous probability in each case is calculated, assuming a given probability distribution and the specified instantaneous average traffic volume for the service being handled, service subscriber or SSP. The probability distribution used is preferably a Poisson distribution, since this method describes the statistical occurrence of independent events and therefore best reflects the statistical fluctuations in telephone traffic. A time sequence of events is therefore generated for each service, service subscriber, and/or SSP, with the number of calls per time unit fluctuating statistically by the predetermined instantaneous average value. In the case of the FPH, TIS, UNU, FPHL, and televoting without precounting services, each generated call potentially becomes an IN-specific event that contributes to the utilization of the intelligent network and therefore is relevant for simulating the performance of the IN, and the SCP in particular.

According to the PROVIDE INSTRUCTION IN messages, the first events generated in this manner are entered in the first transfer file in the global event calendar and in file mode, along with their generation time t1, in chronological order. If the precounting function is active, televoting calls generate a first IN event only after each nth call (PROVIDE INSTRUCTION). This event is also added to the global event calendar or to the transfer file, along with generation time t1. The remaining calls as well as ordinary telephone calls lace a load only on the SSP, but do not cause IN events to be generated.

The traffic generator also generates follow-up events assigned to an IN call or a first event, taking into account the probabilities entered in the configuration file which relate to the further progress of an IN event. For example, if the IN call is properly put through to a real subscriber or is switched to an attendant console based on the call handling information (CREATE-JOIN) from the SCP during the simulation, the call is terminated at the end of the specified average call or recorded announcement duration in that the traffic generator generates the EVENT(CALL END) follow-up event and enters it in the transfer file or in the global event calendar. If the IN call is not put through to the real subscriber communicated by the SCP in the simulation, which the traffic generator determines taking into account the probabilities specified for this purpose, the traffic generator generates the EVENT IN message as the follow-up event, which is used, for example, to request rerouting information from the SCP. The traffic generator is thus able to generate IN-typical event sequences that largely correspond to the real traffic volume in the IN.

The following parameters are stored for each IN event: the call identification number, time t1 at which the SSP sends the message, the message identification number, e.g., 1 for PROVIDE INSTRUCTION, 2 for EVENT, 3 for EVENT (CALL END), the service identification number, e.g., 3 for TIS, 5 for UNU, 6 for FPH, 10+j (J=0, . . . , 89) for the jth service subscriber of the TV service, and an SSP identification number.

In one advantageous embodiment of the present invention, a global title (GT) code is also generated as a routing criterion and stored as a parameter of the IN event, thus providing a global title translation in the IN. The GT class is also generated by a preset probability distribution. The STP/SRP simulator then preferably activates GT-specific process chains which simulate the routing functions on the STP/SRP level, e.g., the switching of a call to the network of a different network provider.

It is also advantageous to assign the events generated by the traffic simulator to user and load classes. Call-specific IN events are assigned to a user class, while management traffic between the IN levels, for example, can be simulated by events in a load class. For each event generated by the traffic simulator, the system generates and stores a corresponding class identifier, which is detected by the other simulation modules and may help determine how the event is to be processed.

In online mode, the traffic generator generates the follow-up events during the simulation run with the given probabilities after the corresponding first events have passed through the SCP simulator and possibly the SS7 simulator modules, i.e., after an event corresponding to the CREATE-JOIN message from the SCP is generated by the SCP simulator and is provided to the traffic simulator for processing, possibly after passing through the SS7 simulator. In online mode, feedback loops between the simulation modules are thus automatically taken into account when the traffic simulator generates IN-specific event sequences.

In file mode, feedback loops of this type can be produced only through iteration, since the simulation modules are invoked sequentially. The first time the traffic simulator is invoked, therefore, the first events are generated in the manner described above, and a preset SCP response time that is, for example, constant over time, is initially assumed for the follow-up events. The next time the traffic simulator is invoked, the response time is corrected by the response times derived from the transfer file transferred by the SCP simulator or the SS7 simulator to the traffic simulator. Multiple passes of the simulator yield a steady state which largely also takes into account interactions between the modules.

In online mode, the IN-specific first events are generated while the overall simulation is in progress, i.e., at each simulation time, for example in ns intervals. This also makes it possible to simulate manipulation of the overload protection mechanism during an instantaneous overload of the remaining simulation modules and to reject a call before a corresponding IN event is generated or forwarded.

According to the theoretical traffic method described above, a sequence of calls arriving at the SSP or at the SSPs which normally produce an IN event can, however, be generated before the simulation begins and processed during the simulation, i.e., they can be forwarded as IN events or rejected by the overload protection mechanism.

The utilization of the signaling channels in the intelligent network can be determined for each simulation time based on the generated traffic volume. The number of voice connections occupied to and from the SSPs and/or the number of serving lines occupied for subscribers of the freephone service can also be logged and output as a function of time, based on the user-defined probabilities concerning the further progress of the call (e.g., a call or recorded announcement of a certain average duration). It is also possible to output, as a function of the simulation time, the number of calls that were rejected at various stages, e.g., directly after generation by the overload protection mechanism, at the end of a timeout if the SCP does not respond, or if all attendant consoles are busy.

Figure 7:
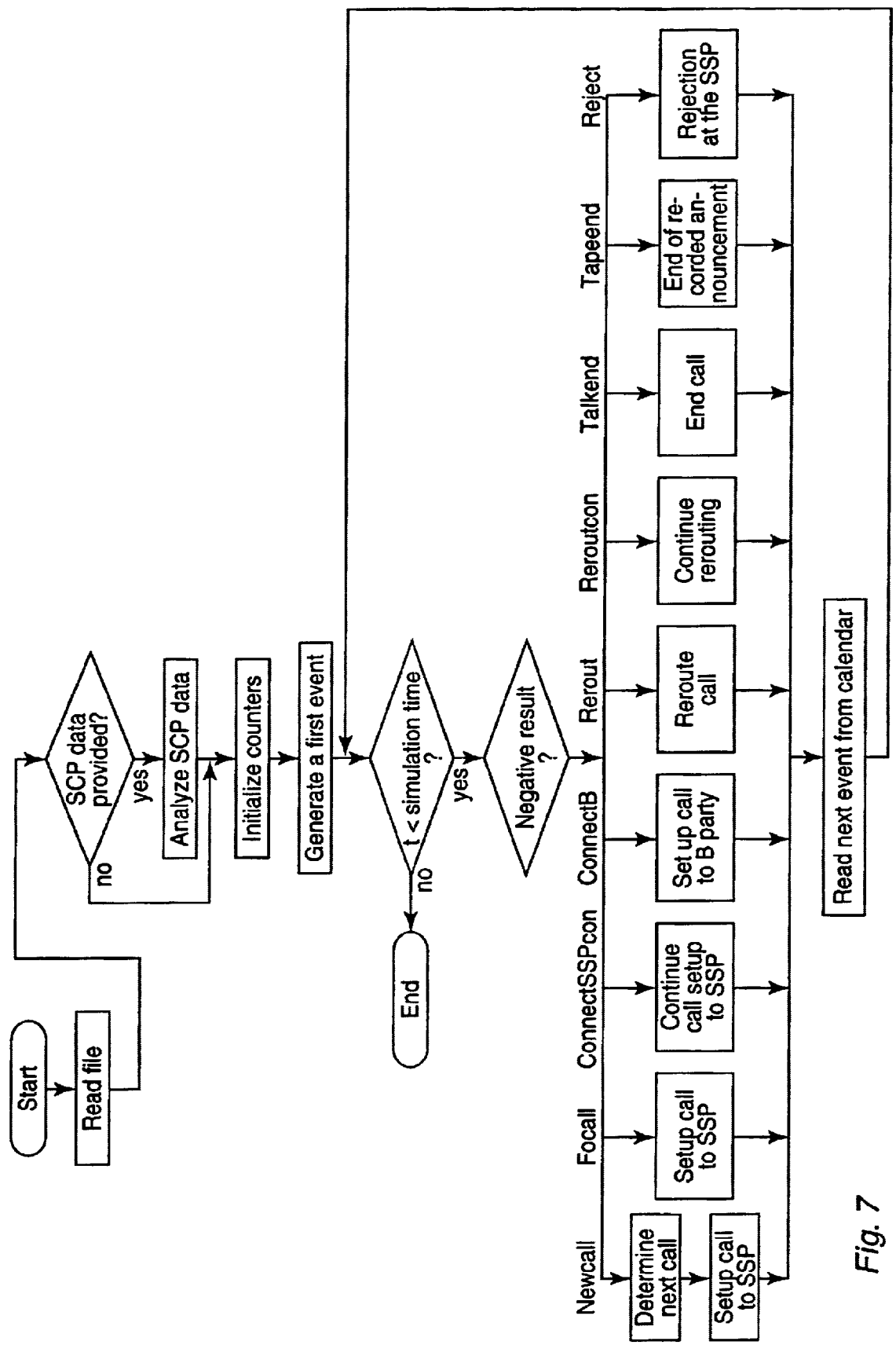
FIG. 7 shows a flowchart of simulator operation in file mode.

FIG. 7 shows a flowchart of the simulation in file mode. After the simulator is started, the input files are read in by the individual simulation modules. The traffic simulator determines whether a file containing messages from the SCP already exists (transfer file 204 from FIG. 2 or 307 from FIG. 3). If it does, the traffic simulator analyzes this data to determine the SCP response times and takes them into account when generating the event sequences. If it does not exist, the system moves on to the next step without performing an analysis and uses a default value for the SCP response times. The counters are initialized by setting an internal simulation clock to a time of zero and setting the status variables and statistical counters to initial values.

In the next step, a start event is generated, i.e., a first PROVIDE INSTRUCTION message, and entered in the event calendar. During the simulation, the event calendar contains all events not yet processed, organized by their start times.

After initialization, the actual simulation begins in a loop. First of all, the abort condition is interrogated, with the simulation being aborted if instantaneous simulation time t exceeds a preset simulation duration. In the loop, the next event is first output from the calendar and the simulation clock is incremented to the time of the next event. At the time the simulation is started, this next event is the first event generated after the simulation. The event type of the event to be processed is determined and the corresponding event routine subsequently executed.

This example provides nine different types of events. From left to right, these are the arrival of a new call (NEWCALL), the arrival of a repeated call attempt (FOCALL), the receipt of the CREATE-JOIN message from the SCP (CONNECTSSPCON), a call setup to the B party (CONNECT B), call forwarding (REROUT), the receipt of the CREATE-JOIN message from the SCP after call forwarding ((REROUTCON), the end of the call (TALKEND), the end of a recorded announcement (TAPEND), and the rejection of a call (REJECT).

The first event entered in the calendar is usually a new call (NEWCALL). The event routine assigned to this event causes the traffic generator to generate the next call and to simulate the call setup procedure to the SSP. The NEWCALL event routine simulates the transmission of an IN message (PROVIDE INSTRUCTION) from the SSP to the SCP by generating a corresponding event and entering it in the event calendar or the transfer file.

The SCP subsequently sends the CREATE-JOIN message to the SSP; in the simulation, the receipt of the CREATE-JOIN message from the SCP is therefore entered in the event calendar as an event occurring at the instantaneous simulation time plus the SCP response time. This ends the first event routine; the simulation clock is put forward to the next event time, and this event is read out from the calendar and processed, unless the simulation time has already expired. The simulation skips the time between two events.

Let us assume that the next event is the receipt of the CREATE-JOIN message from the SCP. The continued call setup procedure from the SSP, using the event routine (CONNECTSSPCON), is simulated. For example, this routine determines, based on the probabilities described above, whether a call is successfully set up to the B party (follow-up event: CONNECTB), in which case the B party can be a real subscriber or a recorded announcement; or whether a call must be rerouted following a previously unsuccessful forwarding attempt (follow-up events: CONNECTB or REROUT). When the CONNECTB event is retrieved, the connection is set up to the B party. The follow-up events are Talk-End or Tape-End, whose times are derived from the average call or recorded announcement duration and the instantaneous simulation time. If the call setup attempt is unsuccessful, a follow-up call is generated with a certain probability, and the FOCALL event entered in the event calendar. The repeated call attempt is subsequently handled just like a first call attempt.

The loop, i.e., retrieving an event from the event calendar, running the corresponding event routine, possibly generating a follow-up event and entering it into the event calendar, setting the simulation time to the time of the next event entered in the event calendar, and retrieving this event, is repeated until the simulation time set earlier has been reached or until an event occurs that marks the end of the simulation. At the end of the simulation, the data entered in the event calendar or in log files and generated and processed by the simulator is available for evaluating the performance of the intelligent network or individual components.

Figure 8:
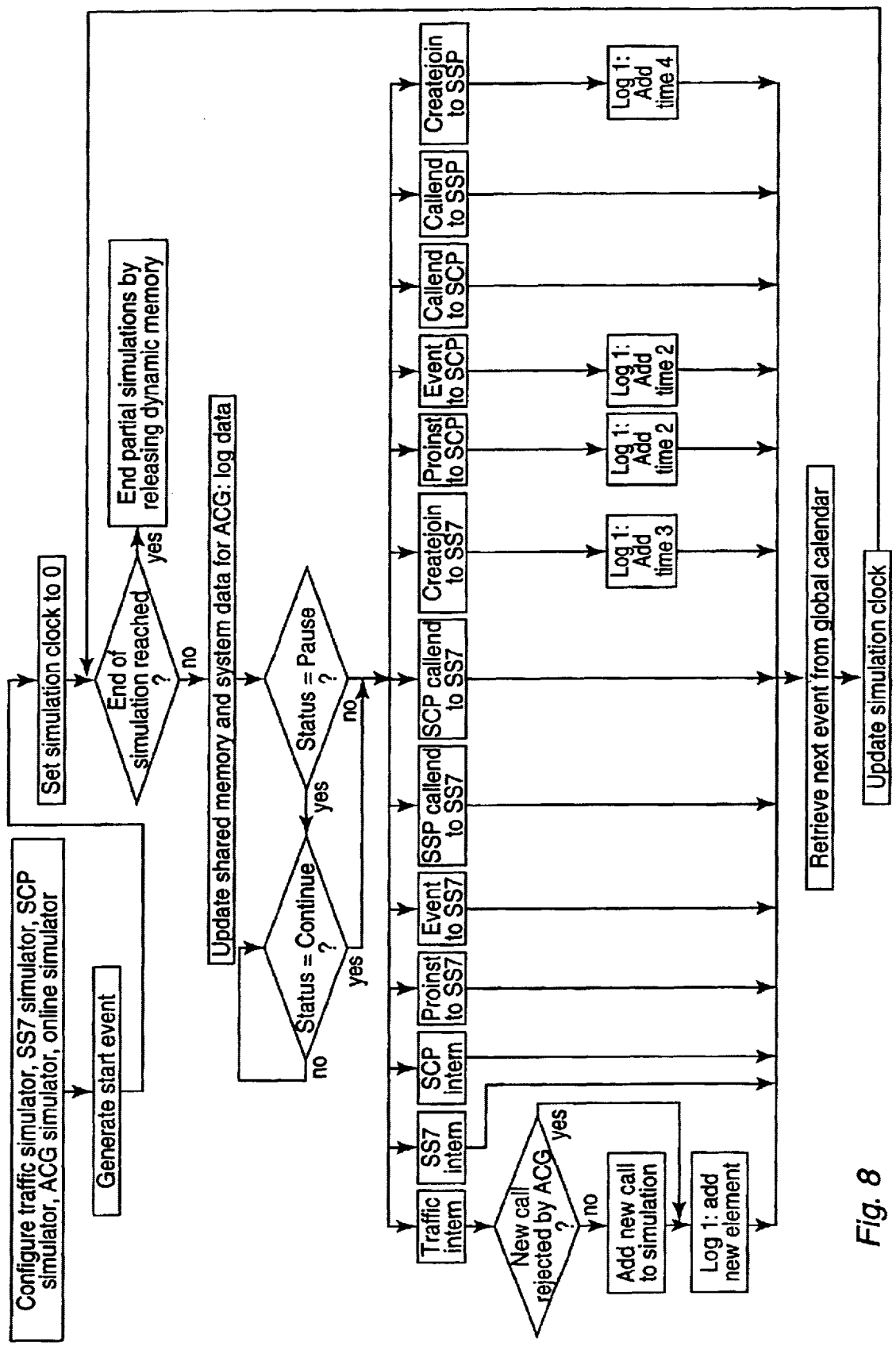
FIG. 8 shows a flowchart of simulator operation in online mode.

FIG. 8 shows a flowchart of the simulation in online mode. First of all, the user sets up the configuration, with the corresponding configuration files being read in by the simulation modules. In the example shown in FIG. 8, the traffic, SS7, SCP, and overload protection (ACG) simulators are active and are administered by the common organization program, the online simulator. As described in the description of FIG. 7, the traffic simulator first generates a start event. The global simulation clock is set to t=0. Like the simulation run illustrated in FIG. 7, the events entered in the global event calendar are retrieved in chronological order in a loop, the corresponding event routines executed, and any follow-up events generated entered in the global calendar. At the end of each event routine, the simulation time is put forward to the time of the next event, and this event is processed. A predetermined maximum simulation time, which is compared to the instantaneous simulation time for each pass through the loop, is again set as the abort condition for the loop. Upon reaching the end of the simulation, the partial simulations are terminated by releasing the dynamic memory. If the end of the simulation is not reached, the shared memory, which the user interface accesses during the simulation, is updated so that the instantaneous system data can be displayed directly for the user. The system data for the overload protection simulation is also updated. The determined measured data, i.e., the SCP utilization, queue length, etc., is then logged at regular intervals, entered in the corresponding log files, and/or displayed for the user. Finally, the next event entered in the calendar is processed.

The example illustrated here distinguishes between a total of 13 global event types, which can be divided into two groups: Internal events: internal events are routines that influence the status of only one individual simulation module. Each simulation module is an independent event-oriented program with a plurality of events and a separate local calendar for administering the events. From the perspective of the sequence control system for the overall simulator, this example includes three global internal events (TRAFFIC_INTERN, SS7_INTERN and SCP_INTERN), each of which provides a reference to the local event calendar.

Figure 9:
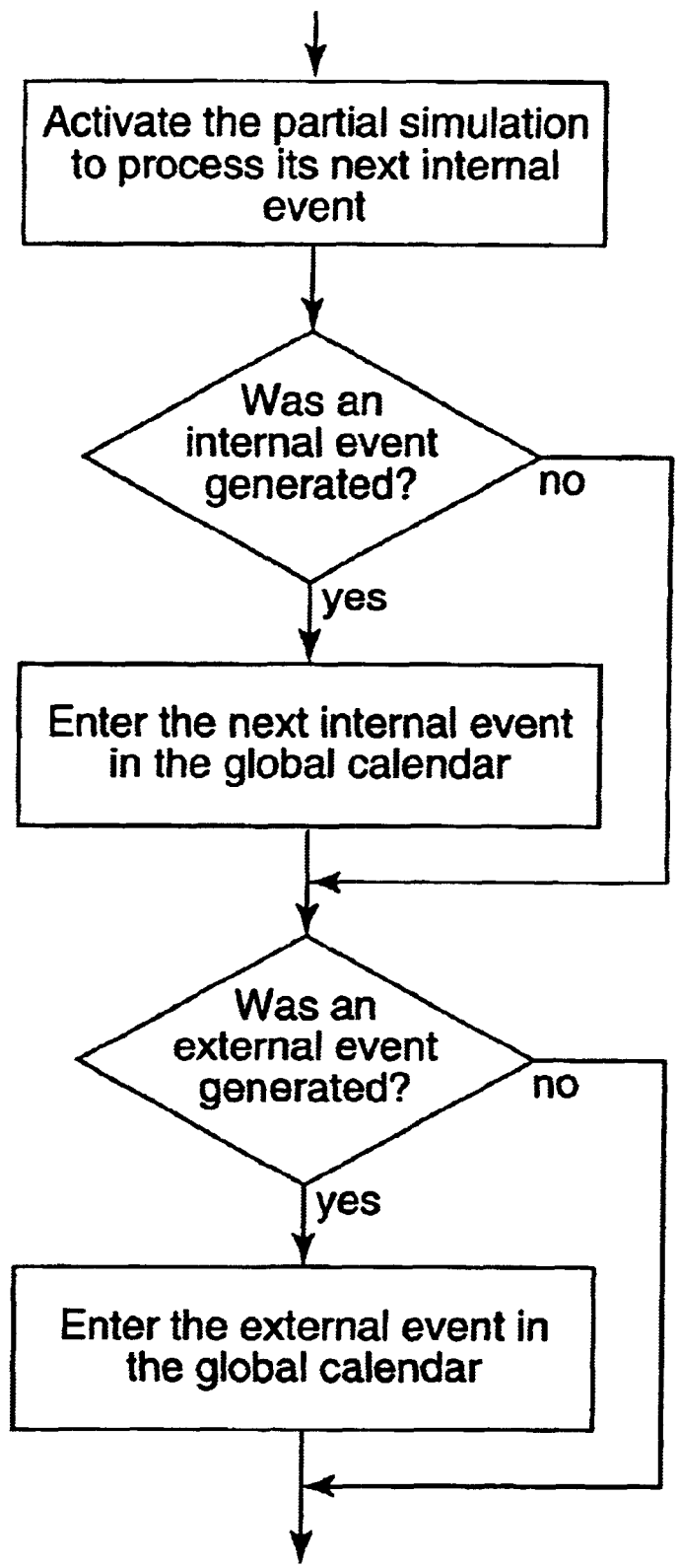
FIG. 9 shows a schematic representation of the processing of a global internal event from the perspective of online simulations.

FIG. 9 shows a schematic diagram of the processing sequence for an internal event of this type from the perspective of the online simulation. As each subcomponent is invoked, the next internal, and possibly the next external, event is generated and entered in the local calendar of the simulation module as a function of the internal program run. In addition, all necessary event parameters are transferred to the sequence control system so that they can be assigned to the global calendar of the overall simulator.

The remaining events in the simulation run illustrated in FIG. 8 are external events that are used for communication between the simulation modules. They correspond to the messages sent from one component to another in a real intelligent network, e.g., PROVIDE INSTRUCTION, CREATE-JOIN or EVENT. The external events that occur here are: PROINST TO SS7, EVENT TO SS7, and SSP CALLEND TO SS7, which correspond to the PROVIDE INSTRUCTION, EVENT, and EVENT (CALL END) messages sent from the SSP to the SCP. The above-mentioned internal events are generated by the traffic simulator (TRAFFIC_INTERN routine) and correspond, in file mode, to the events entered in first transfer file 304 (in FIG. 3).

External events PROVINST TO SCP, EVENT TO SCP, and CALL END TO SCP represent PROVIDE INSTRUCTION, EVENT and EVENT(CALL END) messages, which are transferred from the SS7 system or the SRP/STP to the SCP. These events thus correspond to the events entered in second transfer file 305 (in FIG. 3).

In response, the SCP sends the SCP CALL END TO SS7 and CREATE-JOIN TO SS7 events. The first of these events confirms the call release, while the second simulates the transmission of call setup information. These events correspond to the events entered in third transfer file 306. They are generated by the SCP simulator and address the SS7 simulator. The extern events CALL END TO SSP and CREATE-JOINT TO SSP are generated by the SS7 simulator and are used to forward a message from the SCP to an SSP via the SS7 system. The corresponding events are stored in fourth transfer file 307 in file mode.

The CALL END TO SSP message is needed only if the SS7 is inactive.

To process an external event within the sequence control system, the corresponding message is entered in one of the simulation components. In doing this, the message can cause the component to generate a new internal event that is then forwarded to the online simulator and entered in the global calendar. After an event routine is executed, the next event is output from the global calendar and the simulation clock is updated, i.e., set to the start time of this follow-up event.

When processing the internal event TRAFFIC_INTERN, the traffic simulator is invoked and generates a new call. Based on the instantaneous load on the remaining simulation modules, the system decides whether the overload protection simulator (ACG) will reject this new call. If the overload protection simulator rejects the call, this action is logged, and the event routine ends. If the new call is not rejected, it is added to the simulation, i.e., the corresponding PROVINST TO SS7 event is written to the global event calendar. A new element for the generated call is placed in a log file, with the following data being stored: the identification number of the call that was generated by the traffic simulator when the call was generated, the service identification numbers of the call, the number of the SSP receiving the call, the message identification number, i.e., an indication of whether the PROVIDE INSTRUCTION or EVENT message is present, and time t1 at which the PROVIDE INSTRUCTION or EVENT message corresponding to the instantaneous call was generated. During the course of the simulation, additional time stamps are added to this log line after the SS7 simulator has executed the PROVINST TO SCP or EVENT TO SCP routine (time stamp t2), after the SCP simulator has executed the CREATE-JOIN SS7 routine (time stamp t3), and after the SS7 simulator has executed the CREATE-JOIN TO SSP routine (time stamp t4).

CALL END messages are not logged because the delay times they produce do not contribute to the waiting time of an IN caller and would therefore corrupt the information relating to the response times. If the problem posed is modified, however, it could be useful to also log these time stamps.

The second and third time components contain valid values only if the SS7 simulator was active during the simulation.

Because a complete data record for a single call is produced only at the time when the CREATE-JOIN message arrives at the SSP, the data must first be buffered. A new data record, to which the missing time components are added during the further processing of the program, is created when a call is generated. The following response times can be determined by calculating the differences between the individual time stamps assigned to a call:

t2–t1: delay of a message in the SS7 on the way to the SCP;

t3–t2: delay of a message in the SCP;

t4–t3: delay of a message in the SS7 on the way to the SCP;

t4–t1: total delay of a message in the IN.

The network utilization is stored at regular intervals during the simulation run. Global, statistic network data, and not call-specific information, is stored. The following quantities are preferably logged: the time of the instantaneous measurement, the number of calls arriving in the IN per second, the number of messages currently being processed by the SS7 that are on the way to the SCP, the number of messages in the SCP, and the number of messages in the SS7 that are on the way to the SSP.

The SCP simulator determines the utilization, queue length, and the number of messages processed (dispatches) for each processor and stores them in a log file. The online simulator accesses this data and writes the values determined across all CPUs to a file. The data can be displayed on the user interface during the online simulation.

Finally, the number of lines occupied to and from the SSPs is determined on the basis of the traffic data and logged as a function of the simulation time.

Figure 8A:
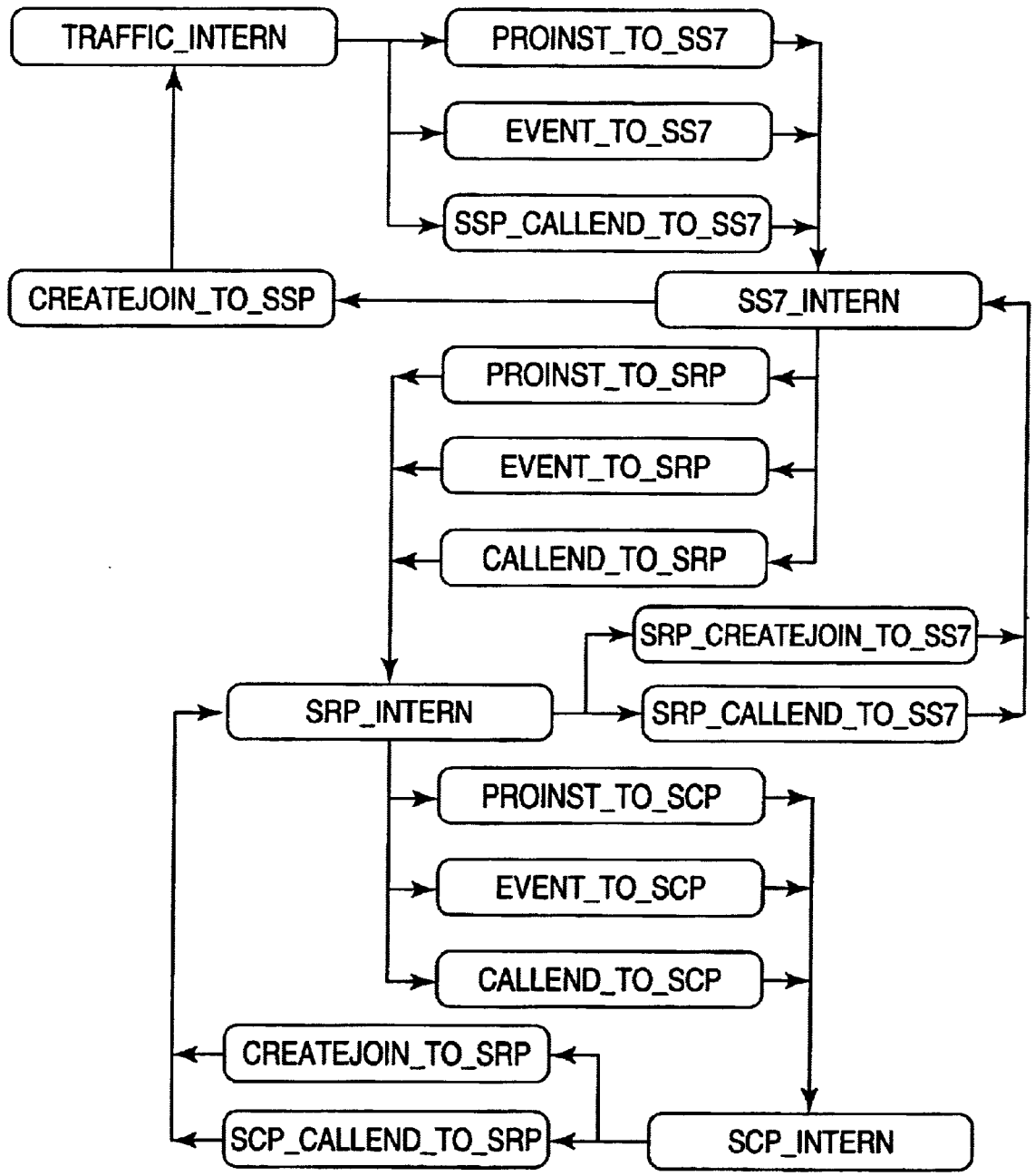

As a supplement to FIG. 8, FIG. 8*a* shows the relationship between the events used. A separate module for simulating the SRP, which can also form part of the SS7 simulator, was added to the simulator in FIG. 8, which is why SRP INTERN events also occur here. The four internal events TRAFFIC_INTERN, SS7_INTERN, SRP_INTERN, and SCP_INTERN invoke a simulation module so that it will process an event. All other external events are used to switch from one simulation module to the next. The start event in the overall simulation is always a TRAFFIC_INTERN event, since the traffic simulator is the source of the IN calls.

After processing an internal event, each simulation module can generate a follow-up event to be processed by the same simulation module. At the same time, one of the external events marked by a descending arrow can be generated. The online simulator receives this information from the corresponding simulation module.

Retrieving an external event is identical to sending a message to the other node in the IN. There are three message types that can be sent. These messages are reflected by three different transitions from the traffic generator to the SCP simulator. A TRAFFIC_INTERN event is retrieved, which generates this message and assigns a unique number (CallID) to this call during the simulation. Depending on the message, this is followed by a PROINST TO SS7, EVENT TO SS7, or SSP CALLEND TO SS7 event and a further TRAFFIC_INTERN event, if more traffic needs to be generated. The external event is then processed and results in an SS7_INTERN event. This event is generated multiple times in succession until the SS7 portion of the SSP has completed all processing operations and an external event for the SRP is generated. The message does not change during this process, i.e., an incoming PROVIDE INSTRUCTION message is also forwarded as such. This external event is then followed by multiple SRP_INTERN events, just like with the SS7-INTERN event. It is transferred to the SCP_INTERN event in the same way that the SS7_INTERN event is transferred to the SRP INTERN event.

After an SCP-INTERN event has been processed multiple times, the SCP simulator asks the online simulator to send a message to the SSP simulator. For this purpose, there are two different messages, CREATE_JOIN and CALLEND, which are forwarded to the SS7 simulator in the same manner described above and produce an SS7_INTERN event. However, only CREATE JOIN events produce a TRAFFIC INTERN event from here; CALLEND events do not cause the traffic generator to generate corresponding follow-up events. Nevertheless, it is possible to configure follow-up calls which are started by the traffic simulator at a time defined by the random number generator if a connection could not be set up. These calls have the same CallID as the original call.

If the traffic simulator is invoked by a TRAFFIC_INTERN event that follows a CREATE-JOIN event, the random number generator determines when the next message relating to this event will be sent, based on the predetermined probabilities. The event chain described above is then started at this time.

If more than one call is generated, this chain of events is applied to each call. The events of multiple overlapping calls are processed according to their positions in the global event calendar.

The structure of the SCP and SS7 simulators is discussed below.

Figure 10:
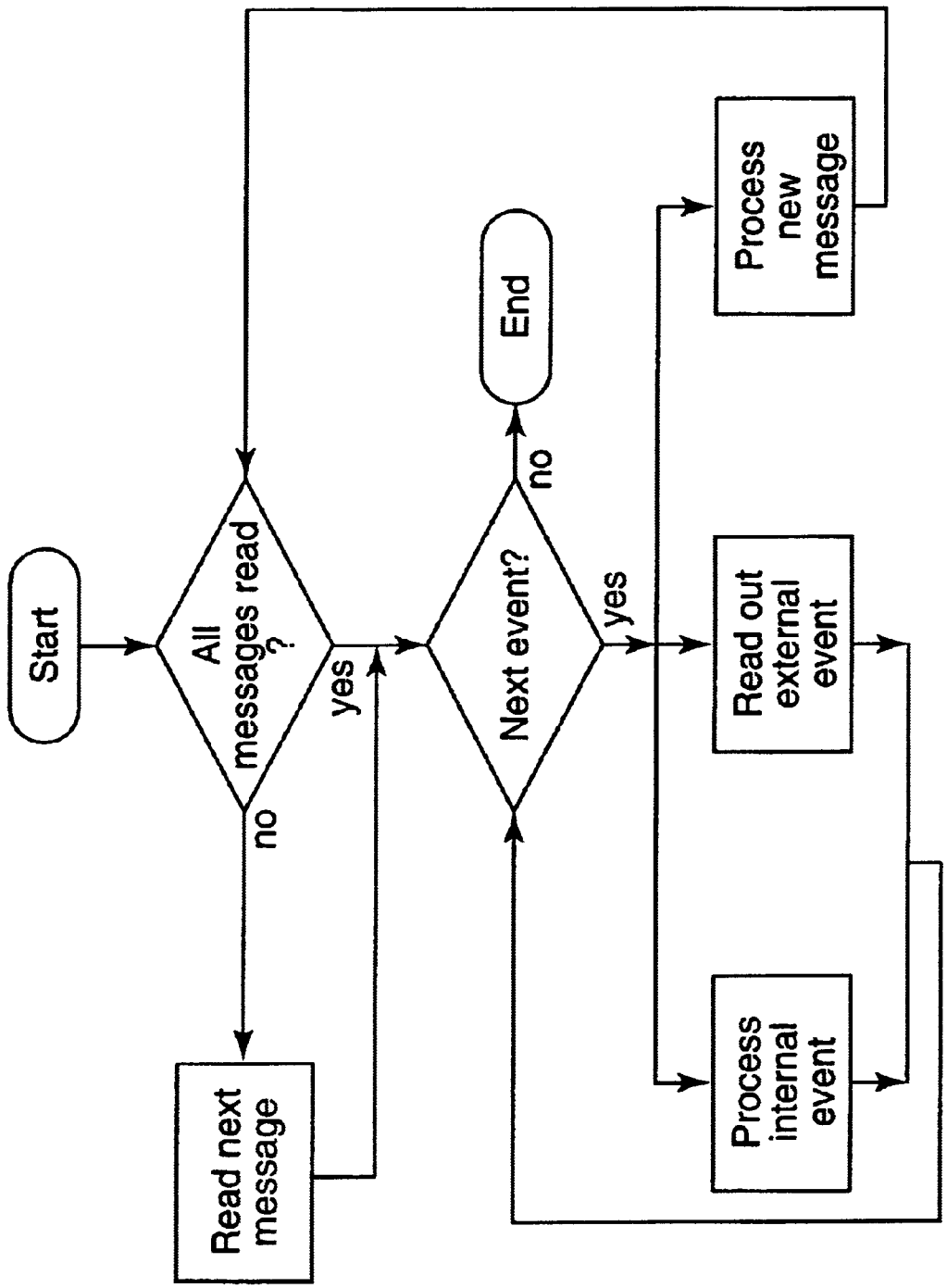
FIG. 10 shows a block diagram of the SCP simulation.

FIG. 10 shows a schematic diagram of the basic SCP simulation sequence. Once again, it is an event-controlled simulation, with only discrete event times being observed and state changes occurring at each event time.

The SCP simulator has a local event calendar in which all events to be processed by the SCP simulator are entered in chronological order. The following event types exist: Messages: messages represent requests from the SSP or SS7 to the SCP for call handling instructions, with the arrival of a message in the SCP or the SCP simulator starting a service processing program composed of a presettable sequence of processes. A message corresponds to a global external event. (Local) internal event: a local internal event ends a process or event and generates a new process or a corresponding event, with the type and attributes of this event being derived from the process chain defined in the service processing program. (Local) external event: a local external event is generated when a service processing program ends, i.e., after executing the last process specified in the process chain. An external event causes a message to be sent to the SSP or SS7, thereby generating a global external event and entering it in the global event calendar.

FIG. 11 shows one example of a configuration parameter in the SCP simulator. The upper portion of the table contains a list of all processes to be simulated that can be executed by the SCP and participate in the connection setup or release process. The individual processes are identified by a process identification number (process ID); the process name is indicated only to make it easier to adapt the configuration to the function of a real SCP. To each process is assigned a process duration, which in this case is indicated in milliseconds, as well as a priority. The settings can be defined by the user, making it possible, for example, to determine the effects of a change in priority assignment or a change in process duration using the simulator.

The lower portion of the table contains the user-definable SCP service run. A process sequence is assigned to each service, identified here by the service identification number, and to each service-specific PROVIDE INSTRUCTION, EVENT or EVENT(CALL END) message, identified by the message identification number. The process sequence or the service processing program is defined by consecutive indications of the process ID for the processes listed above. In addition, a CPU on which the process sequence is executed is assigned to each message according to service. It is also possible to process all messages on all available CPUs.

An individual process can also be divided into any number of subprocesses, between which other processes can be inserted into the process sequence. If the first subprocess in a process sequence occupies a copy corresponding to the process ID, it continues to occupy this copy until the last subprocess has been completely processed. All service processes have a characteristic of this type.

To simulate cache or hard disk access or the incrementing of counters for the TV service, wait processes can also be inserted into the process sequence. In doing this, the average waiting time and its variation must be set; the actual waiting time is derived from the average waiting time during the simulation based on a given probability distribution using these parameters, e.g., a Gaussian distribution.

As shown in FIG. 11, it is also possible to specify, as one parameter, the delay in the ST2000 front-end system, which forms the interface between the SCP and the SS7 system in some network topologies, as well as the maximum counter status for the televoting service.

Figure 12:
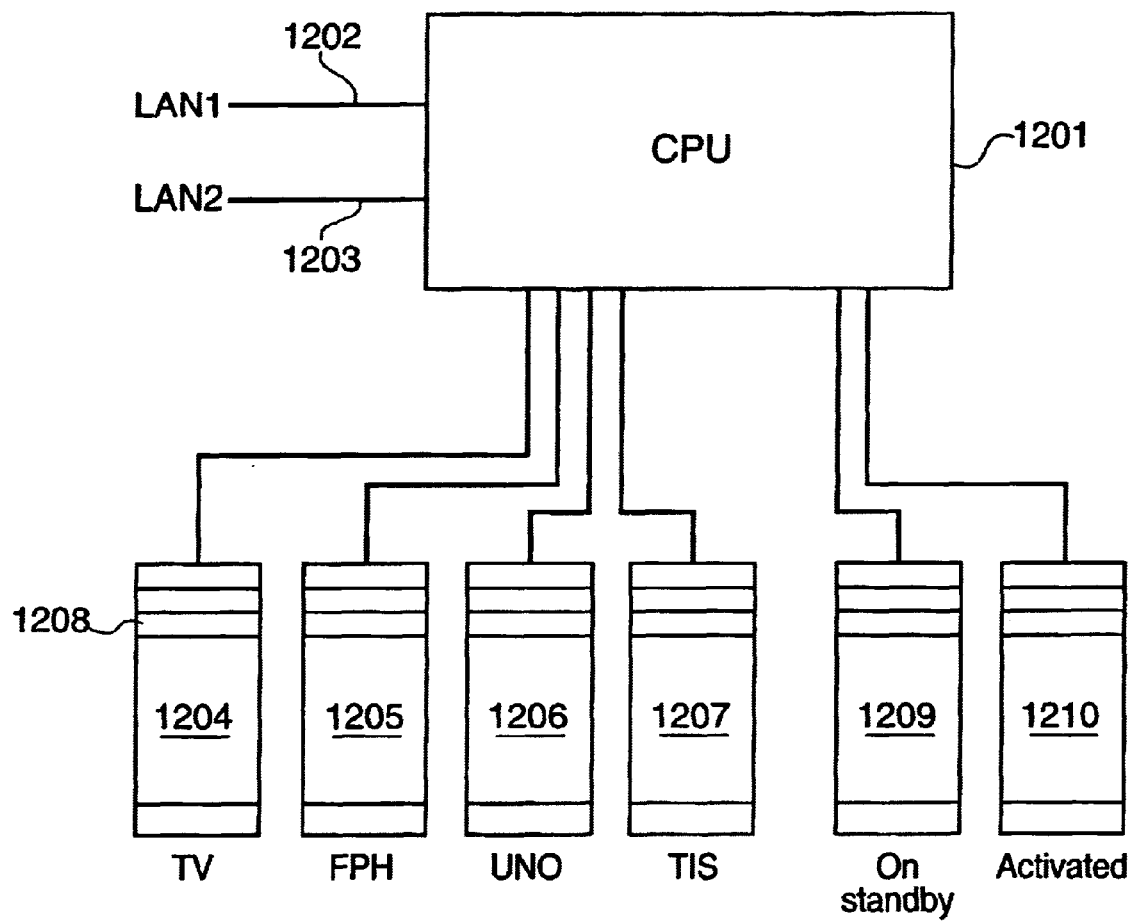
FIGS. 12, 13 show the process management model of a CPU on which the SCP simulation is based.

FIG. 12 shows a model, based on the SCP simulation, for the process management of a CPU 1201 within an SCP. In principle, however, any model of this type of process management in the SCP simulator can be used by defining the queues or event calendar accordingly. The process management only determines the number and type of links between the SCP queues and local event calendars within the SCP simulator, and thus the way in which a message or the resulting individual processes are executed in the simulator. The simulator can be adapted to customer settings with a high degree of flexibility, making it possible to simulate any real situation. No specific hardware and/or software layout is specified, but rather any configuration can be modeled.

In the situation illustrated in FIG. 12, CPU 1201 is connected to the SS7 by two local area networks (LANs) 1202, 1203, for example using two Token Bus LANs, via the ST2000 front-end system.

Messages 1208 (PROVIDE INSTRUCTION) arriving at the SCP are written to service-specific queues 1204, 1205, 1206, 1207, depending on the service. A process or a message waits in this queue for external or internal messages that invoke the process so it can be executed. If a process contains the desired message, it enters the queue of active processes. In this priority queue 1210, the active processes are arranged according to priority, while the events entered in service-specific queues 1204 through 1207 are organized in chronological order. The process having the highest priority in priority queue 1210 is received by the CPU, where it is executed. For example, if a process cannot be executed by the CPU because all incarnations of the process to be invoked are in use, this non-executable process is administered in an additional queue 1209 until a process incarnation is available again and the process changes to the executable state; it is then entered in priority queue 1210.

Figure 13:
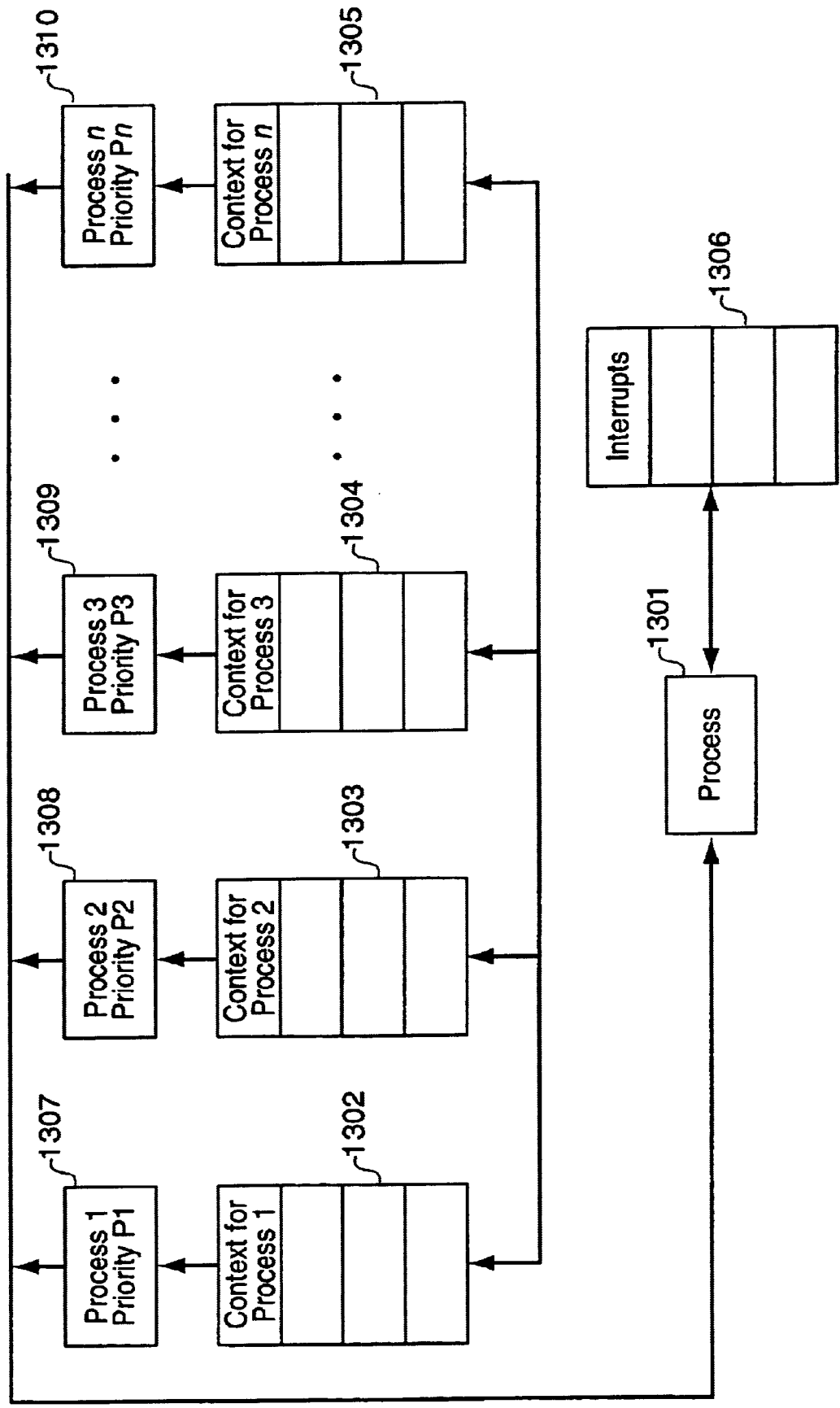

FIG. 13 shows a further model of the process management system of a CPU for simulating the SCP functions. Messages arriving at a CPU 1301 are converted to a process sequence according to the service processing program. The first of these processes is entered in a process-specific queue 1302, 1303, 1304, 1305 so that it can be executed by assigned process routine 1307, 1308, 1309, 1310. The incoming processes are arranged in chronological order in process-specific queues 1302 through 1305. To each process routine 1307, 1308, 1309, 1310 is also assigned a certain priority P1 through Pn. It is also conceivable to have configurations in which queues 1302, 1303, 1304, 1305 are priority-specific only, i.e., all processes, including different ones, take on a certain priority and can then be executed in chronological order.

Multiple incarnations of the process routines can be provided for the same process, for example one copy per service. In this case, process specific queues 1302 through 1305 are also service-specific. If a process routine 1307 through 1310 is ready, the next process is retrieved from corresponding queue 1302 through 1305; the process is then ready. If CPU 1301 is also available, it executes the process. After a process has been executed, CPU 1301 generates the process following the process in the process chain that was just executed and enters it in the corresponding queue. Non-executable processes are administered in an additional queue 1306 until they switch to the executable state. Interrupted, yet executable, processes are placed at the beginning of their queues and are executed next, if this is permitted by their priority.

Processes in progress can be interrupted, for example, by processes or events that simulate the CPU operating system. Events of this type are assigned a higher priority in the simulation than are service-processing processes. The user can set the average time which the CPU should apply for executing such processes. A process of this type is then generated by a random number generator.

Figure 14:
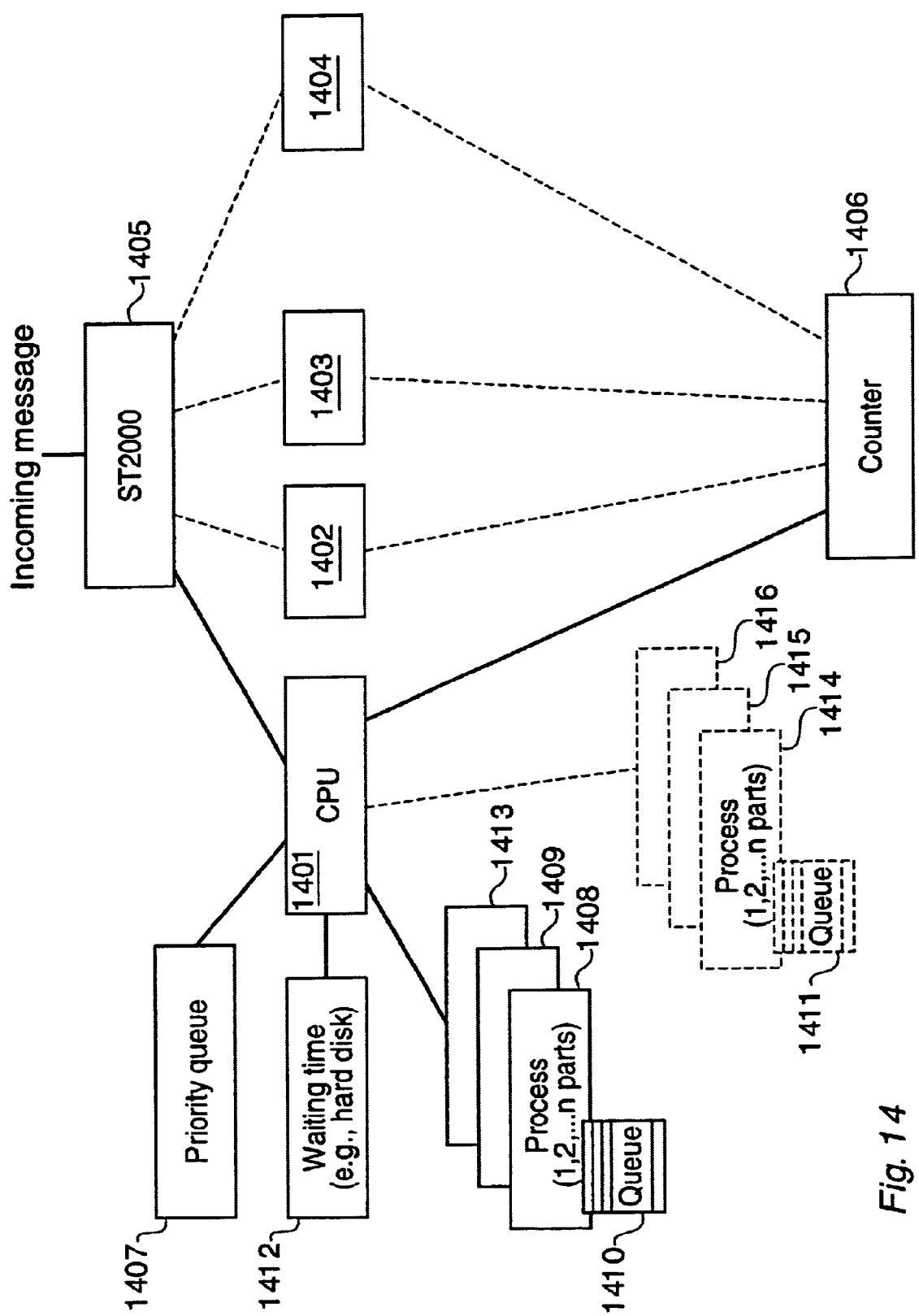
FIG. 14 shows a schematic, object-oriented model of an SCP simulator.

FIG. 14 shows a schematic, object-oriented model of an SCP simulator. The simulator has a plurality of subunits, each of which simulates the function of a CPU 1401, 1402, 1403, 1404. These subunits can be combined as modules to form the SCP simulator.

The ST2000 front-end system (reference number 1405) receives an incoming message and forwards it to a CPU 1401 through 1404 for complete processing depending on predetermined CPU selection criteria. Front-end system 1405 is simulated with a constant delay time. It can also have a separate queue in the SCP simulator.

A follow-up event, e.g., the EVENT or EVENT(CALL END) message, is automatically processed on the CPU which handed the first event, since in reality this is the only place where the call context is stored. However a first event (PROVIDE INSTRUCTION) can be assigned to a CPU according to different criteria: for example, statistic data of the SCP simulator can be used, including CPU utilization, the number of messages to be processed in the CPU together with the present status of the CPU (active or inactive), the total waiting times remaining for all processes running on the CPU or waiting processes. However, this means computing time during the simulation in progress must be devoted to determining the statistic data and thus making a selection. Alternatively, the CPUs can also accept the messages independently: all first events (corresponding to the PROVIDE INSTRUCTION messages) are written to a queue shared by all CPUs; the follow-up events (corresponding to the EVENT or EVENT(CALL END) messages) are entered in CPU-specific and possibly also CPU- and message-specific queues. If a CPU's processor is available, the next message can be automatically read out from a CPU-specific or shared queue.

As it is processed, the event passes through a fixed process sequence during the CPU simulation, as shown in FIG. 11, for example. Each process in the process sequence can also be divided into a plurality of subprocesses, with other processes being executed between the subprocesses. For each process, the CPU contains at least one process routine 1408, 1409, 1413 through 1416, which can be used to execute the processes entered in process queues 1410, 1411 when their turn comes. Multiple incarnations of a process routine can also be provided on the CPU, with an event being assigned, for example, to one of the process routines according to service. In FIG. 14, this is represented by two blocks of process routines 1408, 1409, 1413, and 1414 through 1416, with one process queue 1410 or 1411 each.

An incoming event is processed as follows: The event is first entered in process queue 1410 or 1411 and waits until the process routine of the process to be retrieved becomes available. When the process is ready, the event is placed in the priority queue. The events entered in priority queue 1407 are processed by CPU 1401 consecutively. While the CPU is executing a process, wait events can occur which, for example, simulate hard disk access. These wait events are generated randomly or according to process and entered in a queue 1412. These events have a higher priority and interrupt the process running on CPU 1401.

While a process is being executed, service-specific counter events can be requested which are generated by a counter 1406. This counter 1406 can receive requests from all CPUs, and these requests can also block each other. This delays the process execution times, although it does not place any load on the calling CPU.

To obtain SCP statistic data, the SCP simulator determines the CPU utilization as follows: at each time specified by the user, i.e., every n simulation seconds, the system calculates what percentage of time within completed, user-defined interval $\Delta t$ the CPU was active, i.e., all times of the individual processes running during last interval $\Delta t$ are added up and their percentage of interval $\Delta t$ calculated.

The queue length, which is another SCP load criterion, is derived directly from the length of the respective queues or local event calendars.

Figure 15:
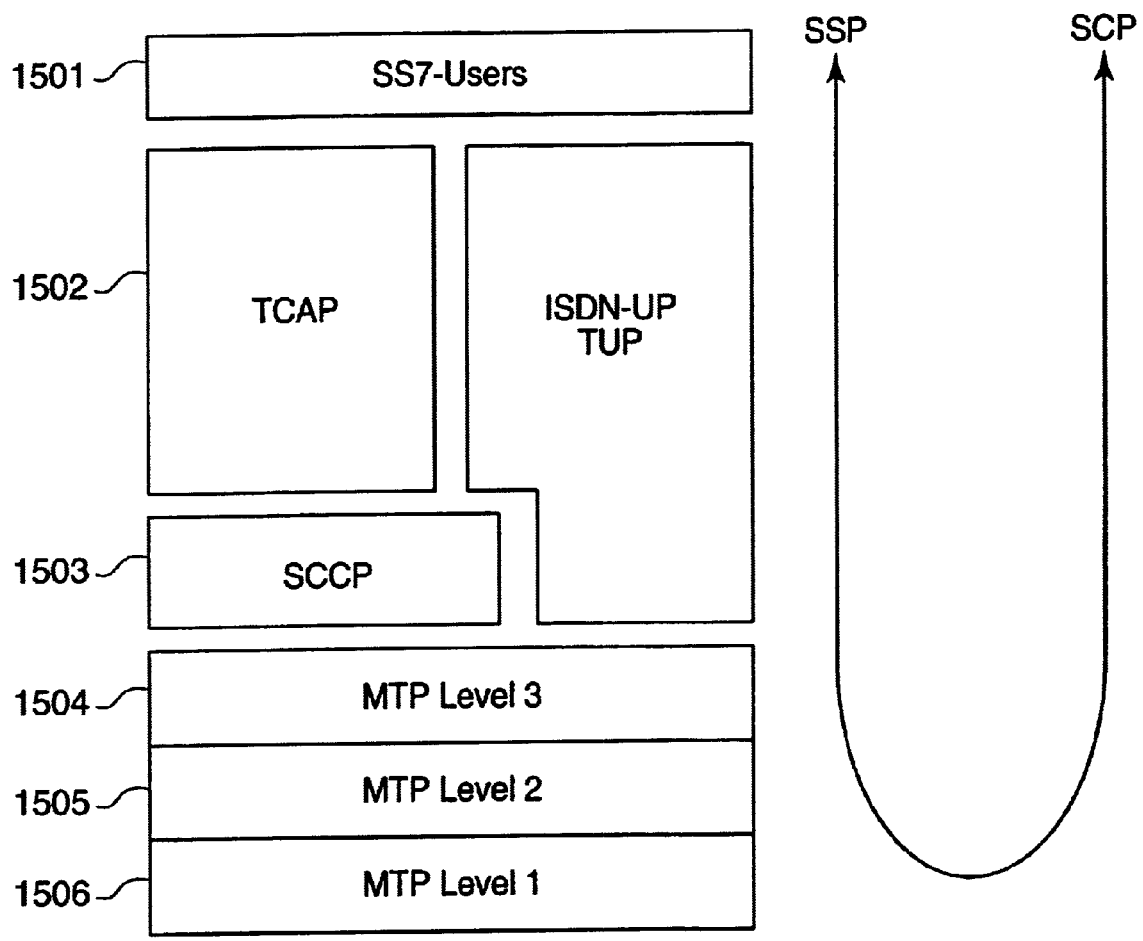
FIG. 15 shows an arrangement of the SS7 layers.

FIG. 15 shows the arrangement of the SS7 layers that take part in the dialog between the SSP and SCP and are therefore simulated with the SS7 simulator. Top layer 1501 is the layer for the SS7 users, and therefore represents the link between the SSP or SCP and the SS7. This layer sends and receives messages to and from the intelligent network or the SS7. Next come the following layers in the order given: TCAP layer 1502, SCCP layer 1503, and MTP layers 1504 (levels 3 to 1), each of which uses a separate processor to perform specific SS7 functions. The flow of messages from the SSP to the SCP is carried out in the manner shown in the right portion of the drawing, passing from layer 1501 to 1504 and back to 1501, and is bi-directional.

SS7 levels 1502 through 1504, i.e., TCAP, SCCP, and MTP 1–3, are modeled separately to simulate the SS7. The individual processes on a level are simulated by delay times. A queue model is used to simulate the flow of signaling messages on one level, or between two levels.

Figure 16A:
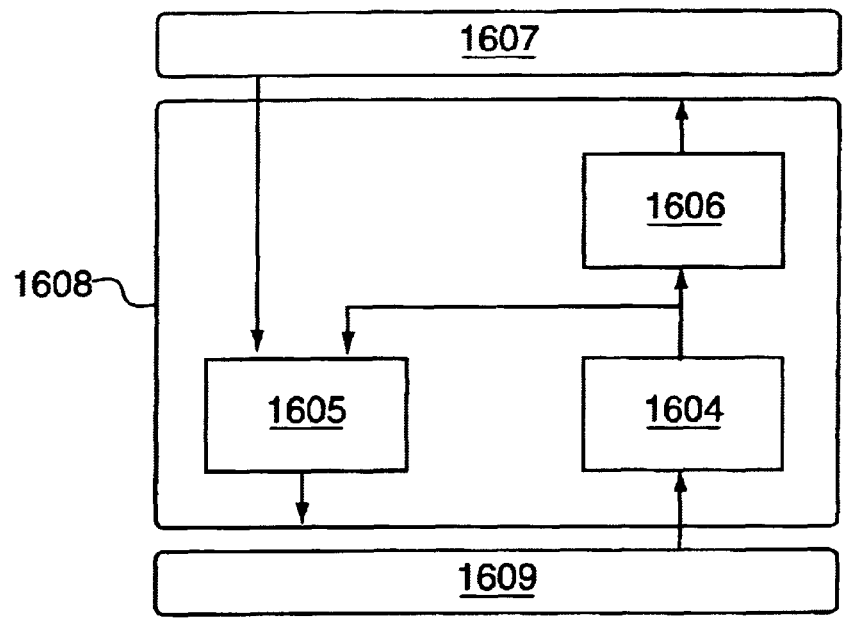
FIG. 16 shows a model of the MTP3 level of the SRP.
Figure 16B:
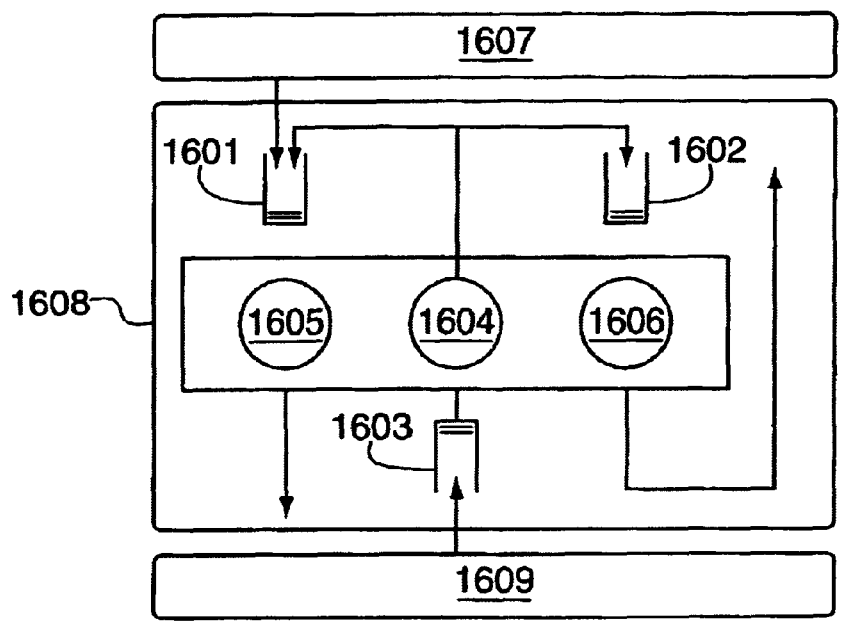

As an example of this, FIG. 16 shows the model of MTP3 level 1008 of the SRP in the SS7 simulator. The three processes that occur on this level are MESSAGE DISTRIBUTION (HMDT), MESSAGE DISCRIMINATION (HMDC), and MESSAGE ROUTING (HMRT). The way in which the processes behave toward each other and toward adjacent layers SCCP 1607 and MTP2 1609 is illustrated by a flowchart in FIG. 16a and by a flowchart with local process queues 1601, 1602, 1603 in FIG. 16b.

Process HMDC 1604 receives signaling messages from the MTP2 level and distributes them according to the message destination nodes. Before being processed by HMDC process 1604, the messages are placed in corresponding process queue 1603. Messages sent to the local nodes, i.e., to the SRP assigned to MTP layer 1608, are forwarded to HMDT process 1605. They are placed in corresponding process queue 1601 and, after being processed by the HMDT process, are transferred to SCCP 1007. If a message is destined for a different node, HDMC process 1604 transfers it to HMRT process 1606. The latter forwards the message to MTP2 level 1609 after it is processed, i.e., after it is retrieved from corresponding process queue 1602.

The same applies to messages that MTP3 level 1608 receives from SCCP 1607.

FIFO queues 1601, 1602, 1603 used in FIG. 16*b* can accept multiple signaling messages and process them consecutively. The processing order depends on the delay time in each case and is entered in the local event calendar of the SRP or SS7 simulator.

Figure 17:
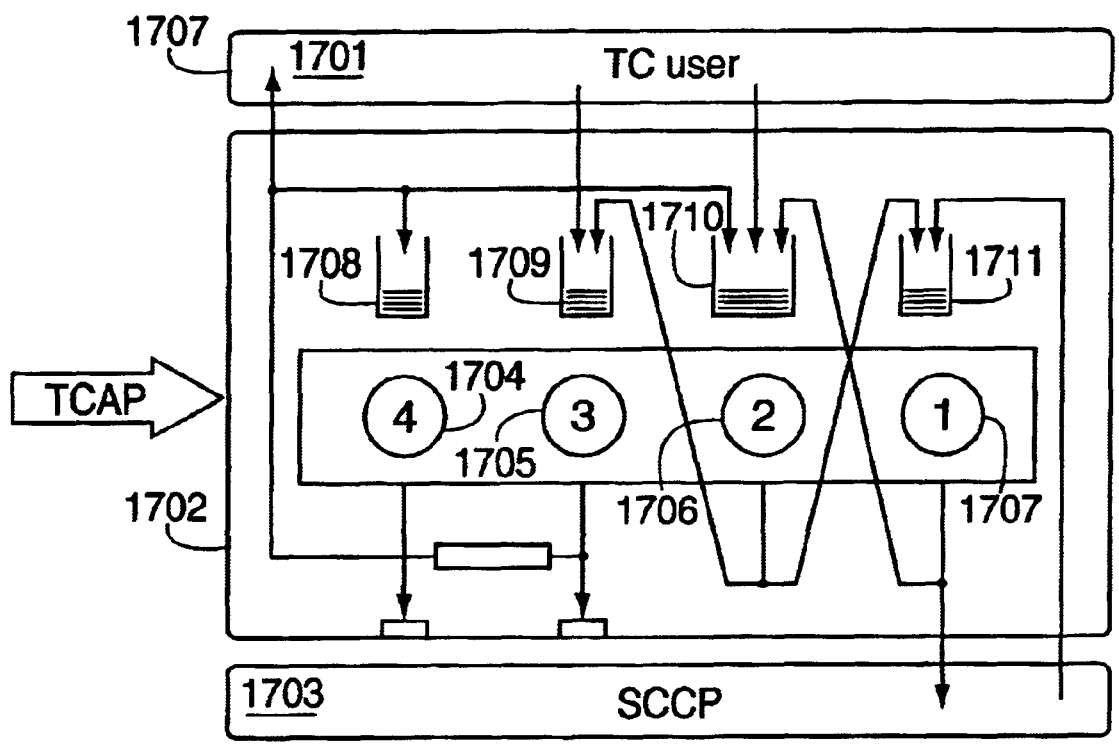
FIG. 17 shows a model of the TCAP layer of the SS7.

FIG. 17 shows a model of the TCAP layer of the SS7 as a further example. According to the representation in FIG. 15, TCAP layer 1702 is located between SS7 USER layer 1701 and SCCP layer 1703. Arrows indicate the message flows between the layers and within TCAP layer 1702. In this example, TCAP layer 1702 simulates four processes: INVOCATION STATE MACHINE 1704, COMPONENT COORDINATOR 1705, DIALOG HANDLING 1706, and TRANSACTION SUB-LAYER 1707. To each of these processes is assigned a process queue 1708 through 1711. After an event entered in one of the queues has been processed, a follow-up process is invoked from the same layer or the message forwarded to the next higher or lower SS7 layer, depending on the message flow illustrated here. The process sequences can be defined by the user and flexibly adapted to the real process flow within a TCAP layer.

FIG. 18 shows an example of configuration parameters in the SS7 simulator. As the first step, the process times for the processes involved in communication between the SSP and SCP can be specified for the individual SS7 layers. In this example, only the process times of the TCAP and SCCP processors on the SSP and SCP sides and the processors on the MTP3 level in the SSP, STP, and SCP area are given. In each case, three or four processes are used per level. Like in the SCP simulation, the process sequence in the SS7 layers can be defined by the user with the service processing program and can thus be flexibly adapted to real conditions. The individual processes can also be assigned a specific priority, although this is not illustrated in the figure.

The lower portion of the table shown in FIG. 18 contains the user-definable parameters relating to the topology of the intelligent network in the SS7 area, e.g., the number of SCPs, the number of signaling channels between the SSP and STP and between the STP and SCP, the runtime-specific message delay between the STP and SSP or SCP, and the delay between the processors. The message length can also be specified.

Figure 19:
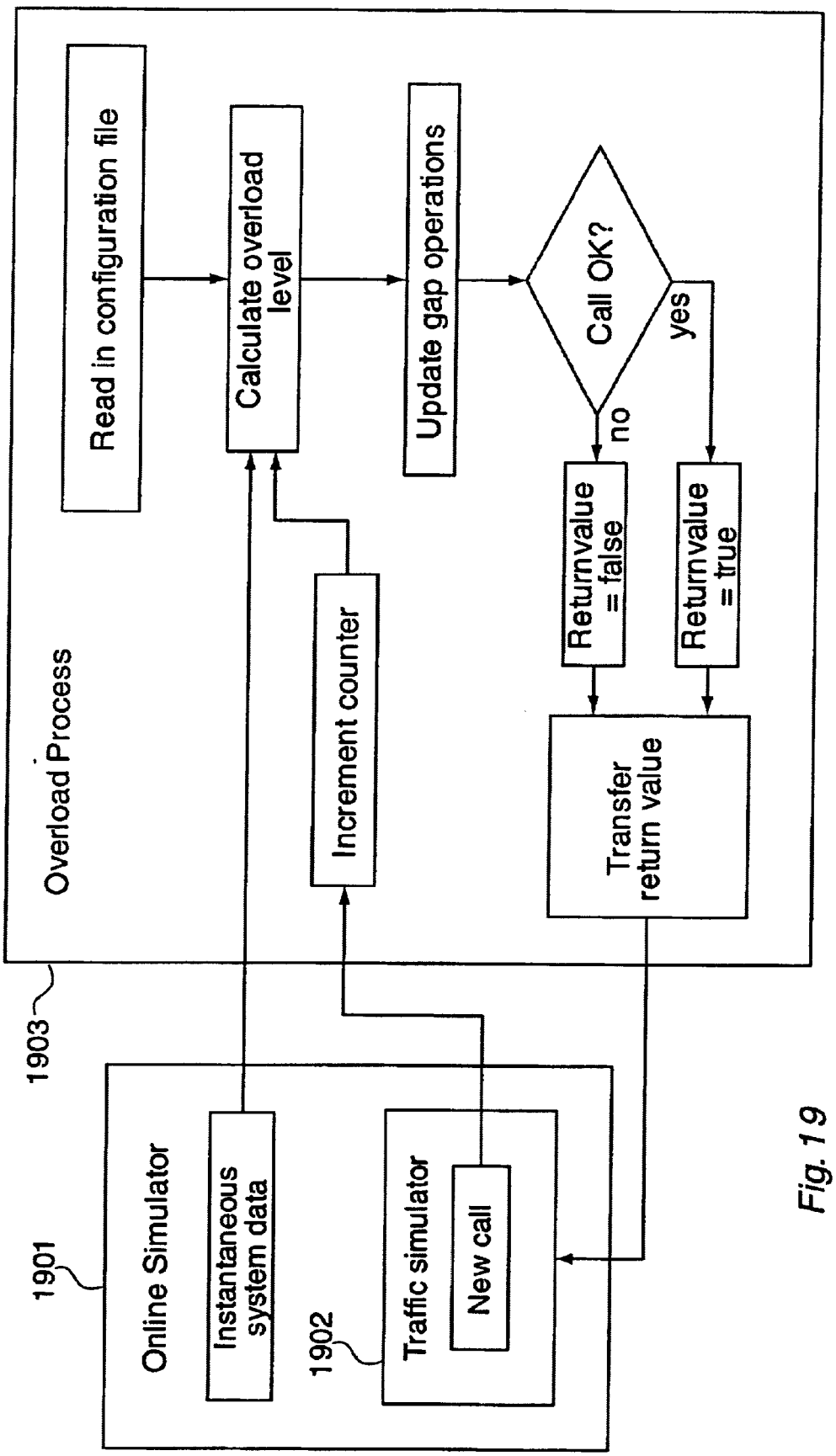
FIG. 19 shows the implementation of the overload protection simulator in the IN simulator in online mode.
Figure 19A:
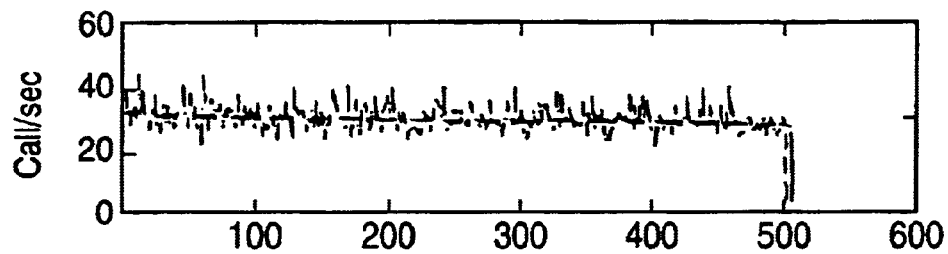
Figure 19B:
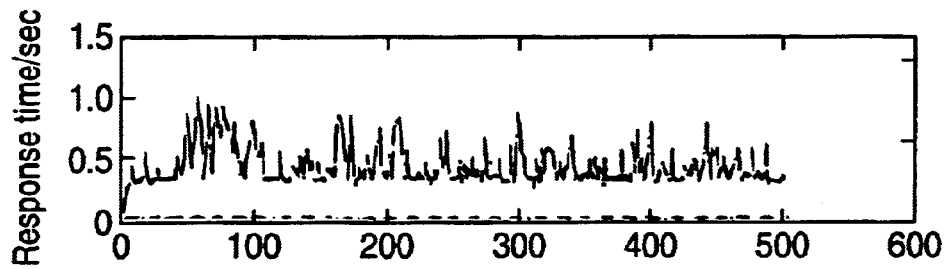
Figure 19C:
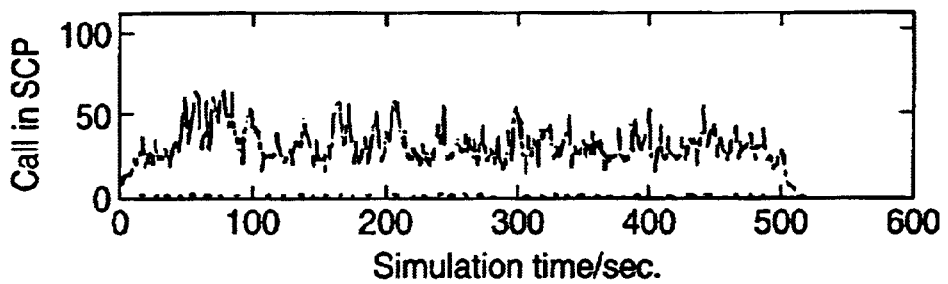
Figure 19D:
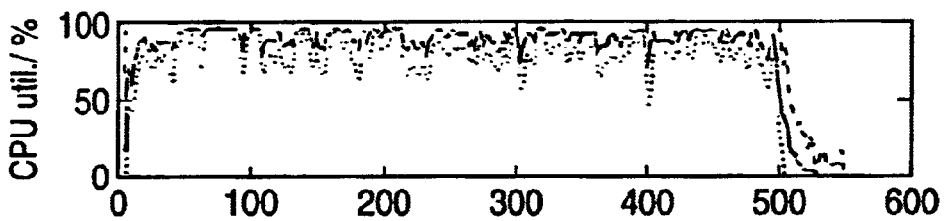
Figure 19E:
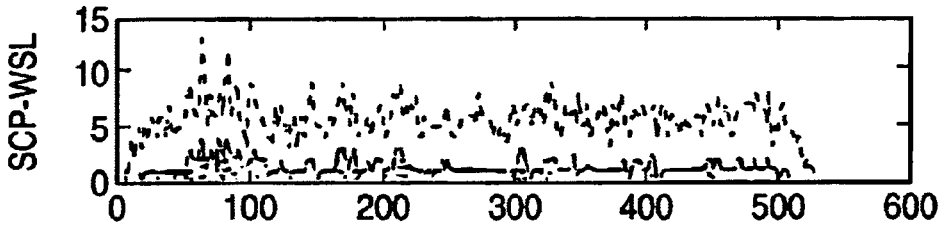
Figure 19F:
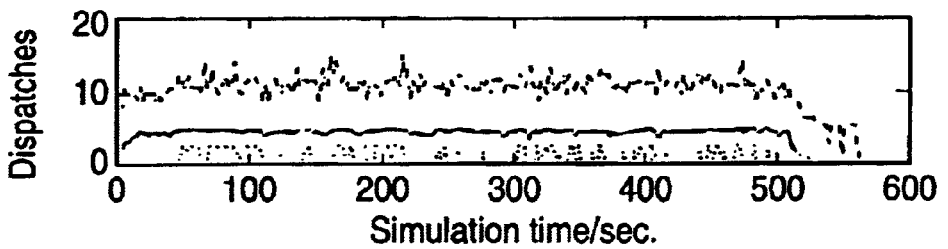

FIG. 19 shows how overload protection simulator 1903 is implemented in the IN simulator in online mode as well as its principle operation. In this example, overload protection simulator 1903 regulates the traffic volume generated or forwarded by traffic simulator 1902 on the basis of system data that enables conclusions to be drawn about the instantaneous load situation, particularly that of the SCP simulator, with this data being administered by online simulator 1901, and transferred to overload protection simulator 1903 via the online interface.

In the example illustrated here, overload protection simulator 1903 regulates the traffic volume generated or forwarded by traffic simulator 1902 according to the Automatic Call Gapping (ACG) principle: for example, only one call, possibly with predetermined attributes, can be sent from the SSP to the SCP within an interval $\Delta t1$ (gap time). Interval $\Delta t2$ (gap duration) indicates how long a reduction operation of this type lasts. Overload protection simulator 1903 can also be used to simulate overload protection mechanisms according to the "leaky bucket" principle.

Overload protection simulator 1903 (overload process) is invoked by traffic simulator 1902. In doing this, the latter transfers a call with the relevant parameters, such as service, message, SSP identification numbers, or time. In addition to this data, the overload process receives the instantaneous system data, such as CPU utilization, response times, and queue length, from online simulator 1901. Once the overload process has been initiated, it is controlled by its own counters and the transferred system data. A separate counter can be provided for each SSP, service, and/or service class. After the call has been recorded by the corresponding counter, the overload protection simulator calculates the instantaneous overload level using the system data. The gap parameters are then read out from the initialization table for the instantaneous overload level. The initialization table is stored in the initialization file, which is retrieved when overload protection simulator 1903 starts. The gap parameters include interval $\Delta t1$ (gap time), within which only one call, possibly with predetermined attributes, can be sent from the SSP to the SCP, and interval $\Delta t2$ (gap duration) which indicates how long a reduction operation of this type lasts.

To calculate the instantaneous overload level, all calls within a presettable time window are counted and possibly weighted in time. This weighting advantageously depends exponentially on the age of the call, with a more recent call being given a greater weight than an older call. In addition, the load is distributed to the SSPs or to the services, making it possible to also simulate service- and/or SSP-dependent overload protection, in which case calls having certain attributes are suppressed selectively.

The user can define different overload levels to which are assigned user-defined gap parameters.

After the overload level has been calculated, the gap operations are updated accordingly, e.g., the length of time interval $\Delta t1$ or $\Delta t2$ is adjusted. The system then checks whether or not such operations apply to the instantaneous call. If it was successful, the process to be invoked is then assigned the return value TRUE or some other identifier; otherwise it is assigned the value FALSE, or another assigned identifier.

Traffic simulator 1902 evaluates the return value. If the value is FALSE, a follow-up call is generated based on a preset probability. If it is TRUE, traffic simulator 1902 forwards the call to the online interface, from where it is transferred to the SCP or SS7 simulator. The traffic simulator then generates a new call, and the process begins all over again.

Figure 20:
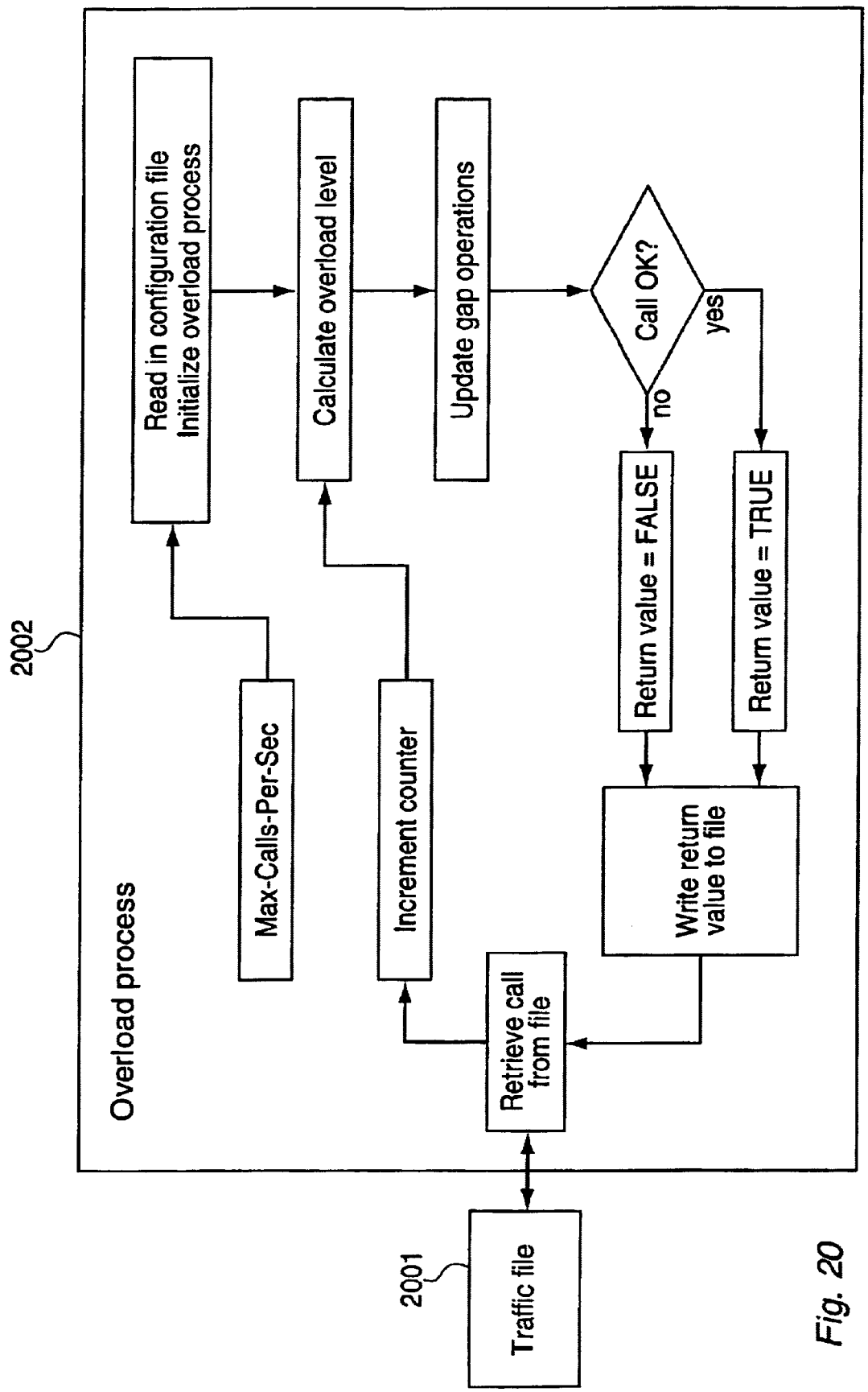
FIG. 20 shows the implementation of the overload protection simulator in the IN simulator in file mode.

FIG. 20 shows how overload protection simulator 2002 is implemented in the IN simulator in file mode. In file mode, the calls are first generated by the traffic simulator and placed in a transfer file 2001. Because it is not possible to transfer any instantaneous system data to overload protection simulator 2002 in file mode, the simulator itself measures the instantaneous load in the form of calls per time unit. The instantaneous load is compared to a predetermined value for the maximum number of calls sent by the traffic simulator; this number is stored, for example, in the initialization file. The instantaneous overload level is calculated on the basis of the instantaneous incoming load and the maximum outgoing load. Like in online mode, the new protection parameters are read out of the initialization table and the protection operations updated.

FIG. 21 shows an example of simulation data determined by the IN simulator. This representation is based on the configuration established by the configuration files shown in FIGS. 6, 11, and 18. The SS7 simulator is active, while the overload protection simulator is inactive. A telephone traffic volume of 30 calls per second at intervals of 0 to 500 seconds is specified.

Figure 21A:
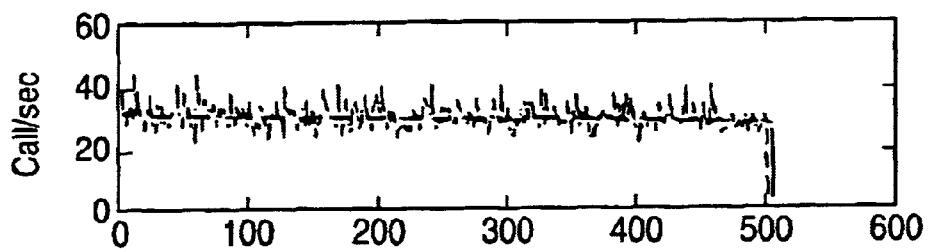
FIGS. 21, 22, 23 show examples of simulation data obtained with the IN simulator.
Figure 21B:
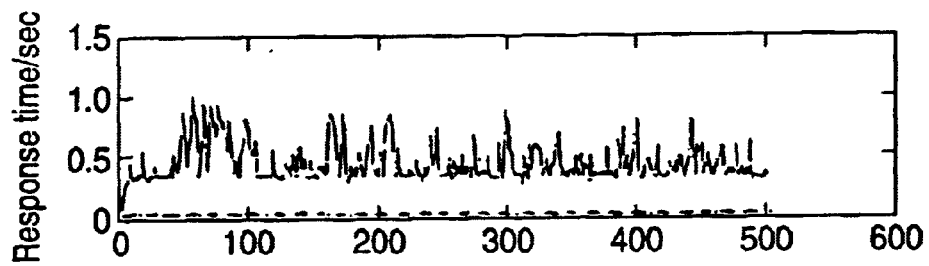
Figure 21C:
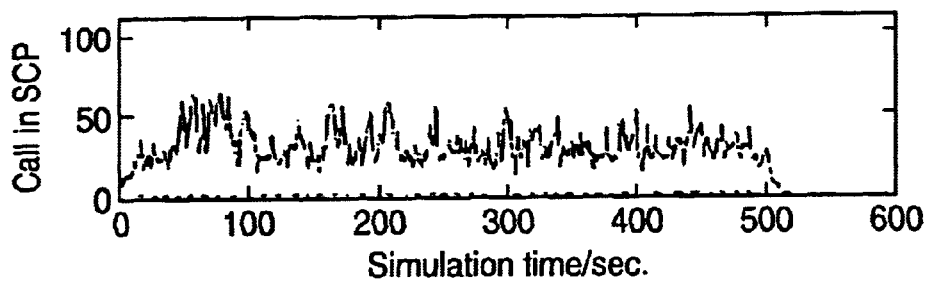

FIGS. 21a through 21c show the data determined by the simulator for network statistics. FIG. 21a shows the preselected average telephone traffic and the telephone traffic generated by the traffic simulator as a function of the simulation time. The set telephone traffic is represented by the dotted lines and corresponds to the settings shown above, i.e., 30 calls per second remain constant at intervals from 0 to 500 seconds, followed by 0 calls per second. The generated telephone traffic, represented by the solid line, shows statistical fluctuations about the preselected average value. It drops to zero after time t=500 seconds.

FIG. 21b shows the SCP response time in seconds as a function of the simulation time. With a constant telephone traffic of 30 calls per second, the steady state sets in according to this simulation result, i.e., the SCP processes the requests sent to it with a response time of 0.4 to 0.7 seconds.

FIG. 21c shows the number of messages provided in the SCP simulator for processing as a function of the simulation time. According to expectations, the number of calls in the SCP and the SCP response time correlate strongly to each other.

Figure 21D:
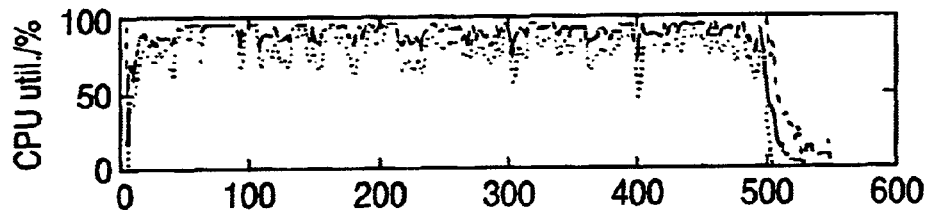
Figure 21E:
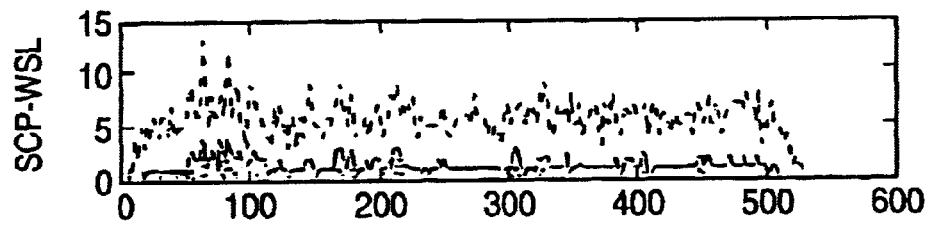
Figure 21F:
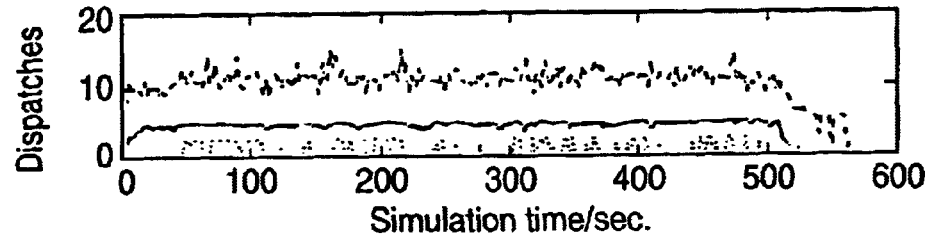

FIGS. 21d to 21f show SCP statistic data as a function of time, i.e., CPU utilization as a percentage, number of messages in a CPU queue, and the number of processes executed by a CPU per time unit, The figures show the maximum, minimum, and average CPU utilization, queue length, and number of dispatches. The number of messages that are being processed at a given time in the SCP fluctuates on average between 20 and 60 in the representation in FIG. 21c, while the queue contains an average of only 6 messages as shown in FIG. 21e. These values, as well as the average CPU utilization of 80%, lead to the conclusion that the SCP can easily handle a traffic volume of 30 calls per second in the selected configuration.

Figure 21G:
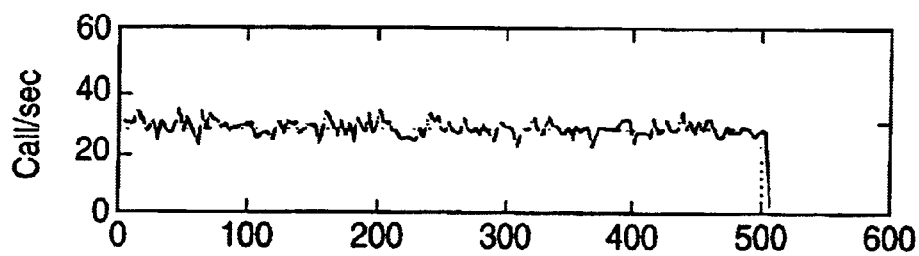
Figure 21H:
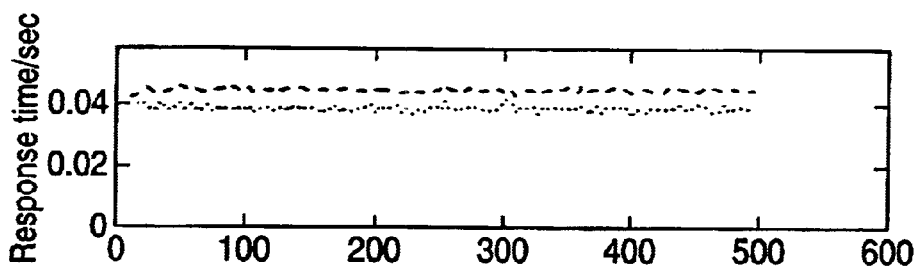
Figure 21I:
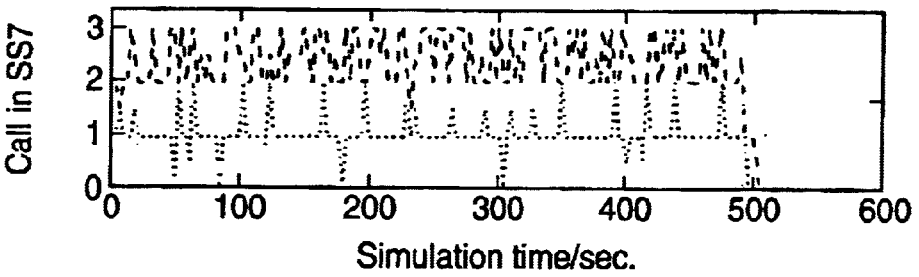

FIGS. 21g to 21i show SS7 statistic data. FIG. 21g corresponds to 21a and shows the set or generated telephone traffic as a function of the simulation time. FIG. 21h shows the delay of a message in the SS7 simulator on the way from the SSP to the SCP (broken line) as a function of time, as well as the delay of a message on the way from the SCP to the SSP (dotted line). FIG. 21i shows the number of messages in the SS7 in the direction of the SCP (broken line) and in the direction of the SSP (dotted line) as a function of the simulation time. The delay times in the signaling system are far below those in the SCP and reach a maximum value of 0.045 seconds.

Figure 21J:
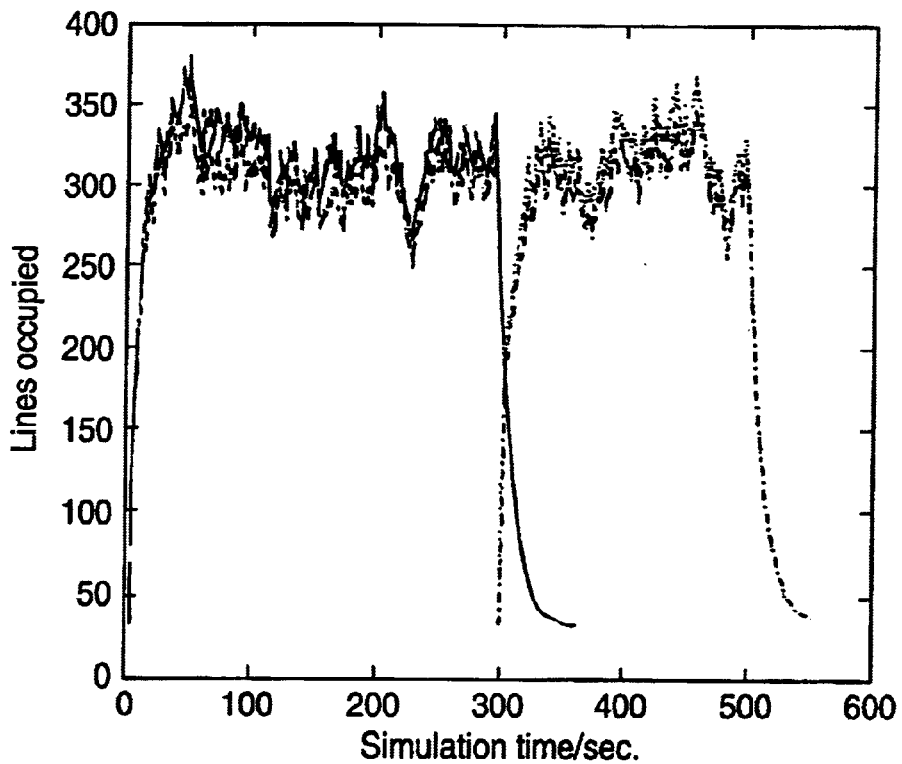

FIG. 21j shows the SSP statistic data as a function of time, i.e., the number of lines occupied to and from SSP1 and SSP2 (left and right curves). The number of lines occupied to and from the SSPs reaches a steady state at around 300. At time T=300 seconds, the entire telephone traffic switches from SSP1 to SSP2. This condition was set in the traffic file.

FIG. 22 shows a further example of simulation data determined by the IN simulator, in this case with a greatly fluctuating traffic volume. The traffic volume was varied every 100 seconds, from 40 to 20, to 80, to 10, to 50, and to 5 calls per second. The SS7 simulator is active, while the overload protection simulator is inactive. The illustrations are assigned to the simulated quantities in the same manner as in FIG. 21.

Figure 22A:
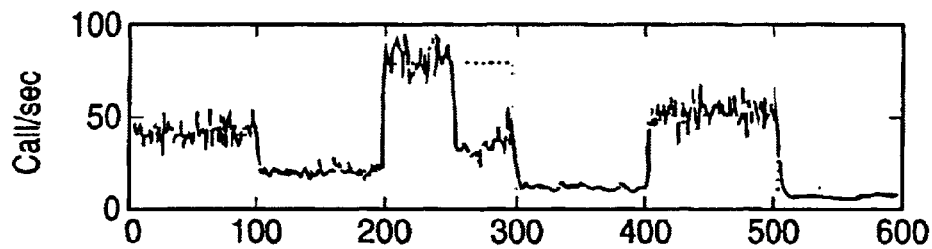
Figure 22B:
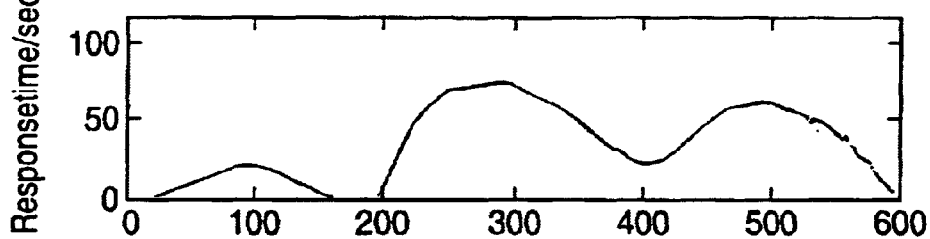
Figure 22C:
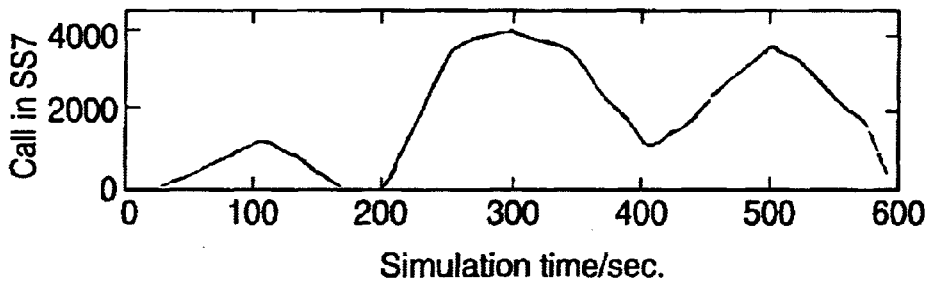
Figure 22D:
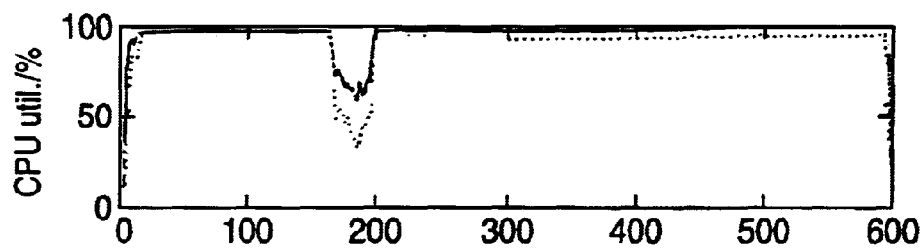
Figure 22E:
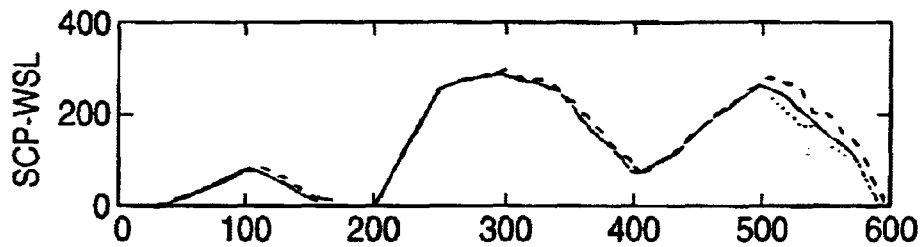
Figure 22F:
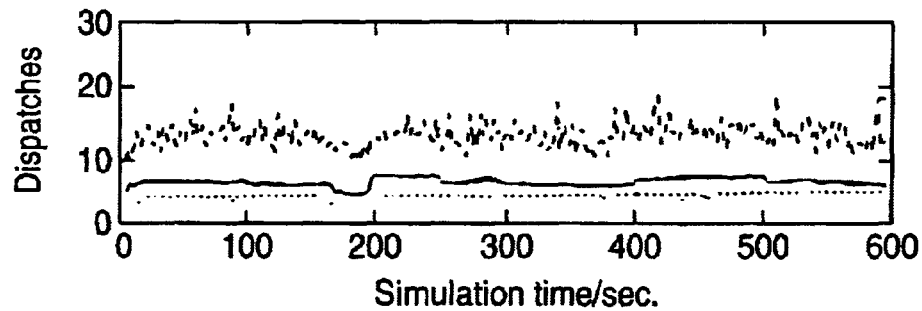
Figure 22G:
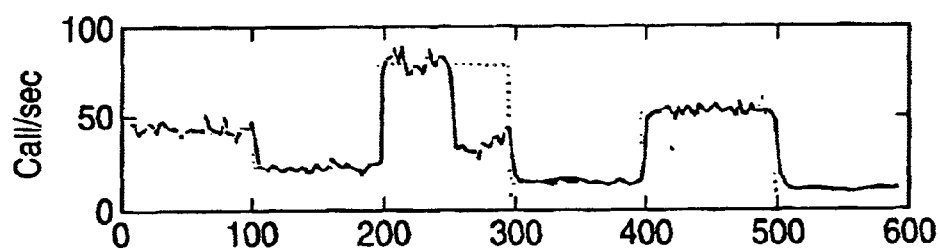
Figure 22H:
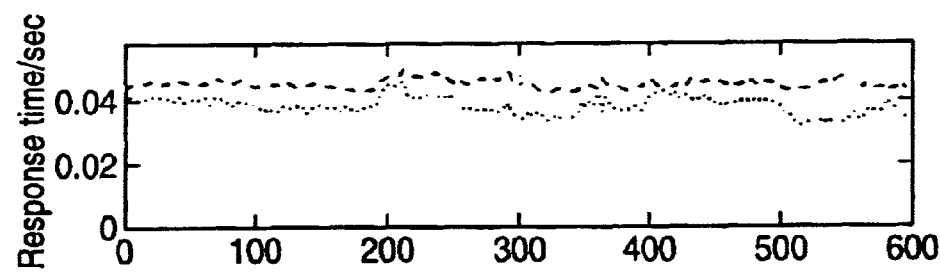
Figure 22J:
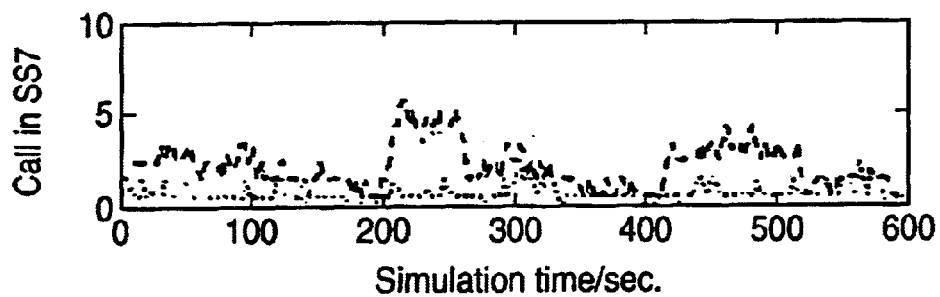
Figure 22I:
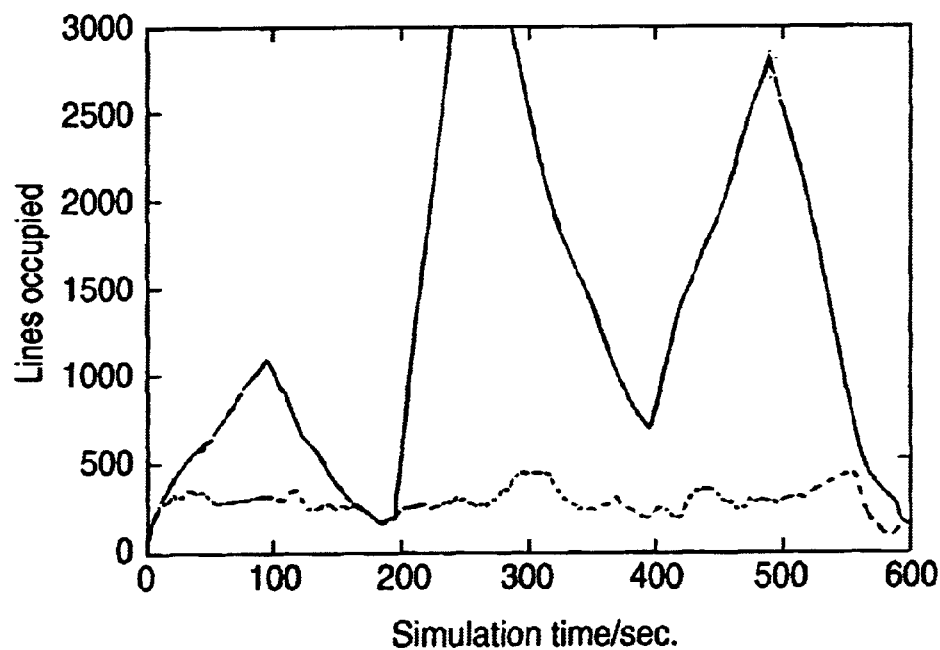
Figure 23A:
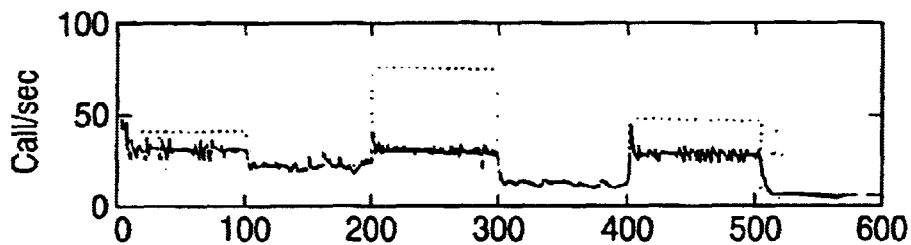
Figure 23B:
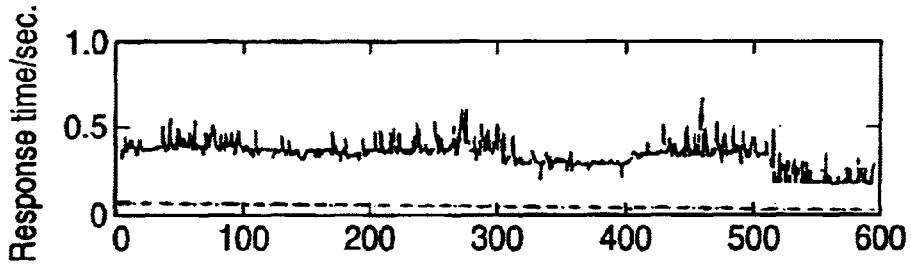
Figure 23C:
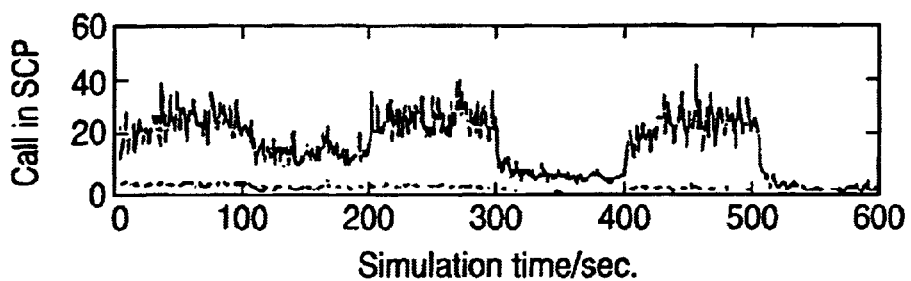
Figure 23D:
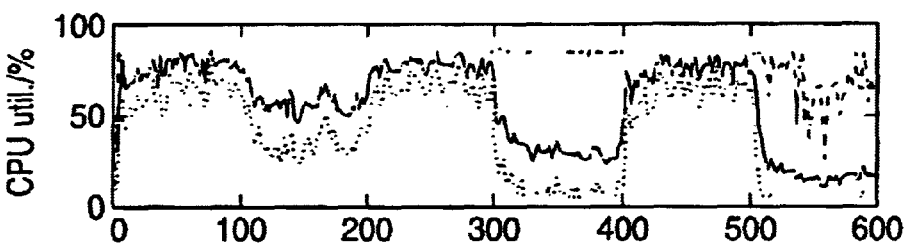
Figure 23E:
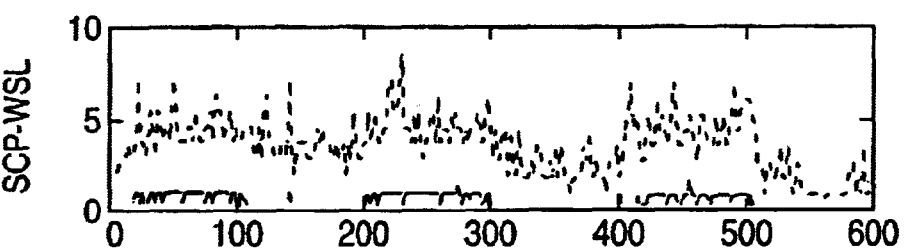
Figure 23F:
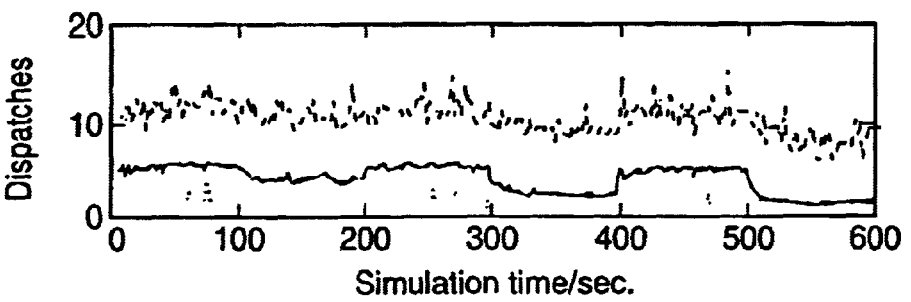
Figure 23G:
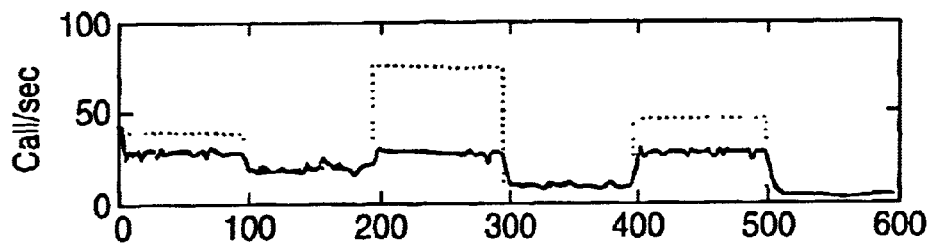
Figure 23H:
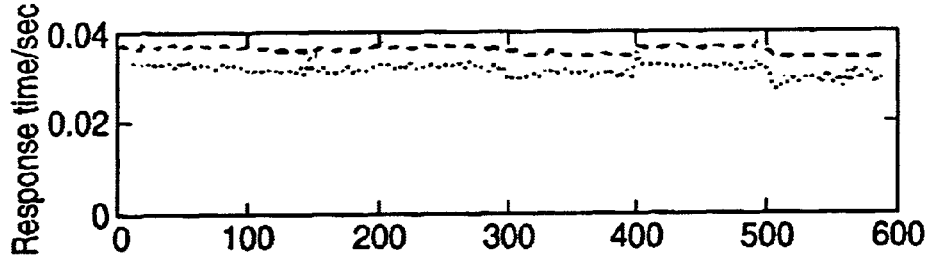
Figure 23I:
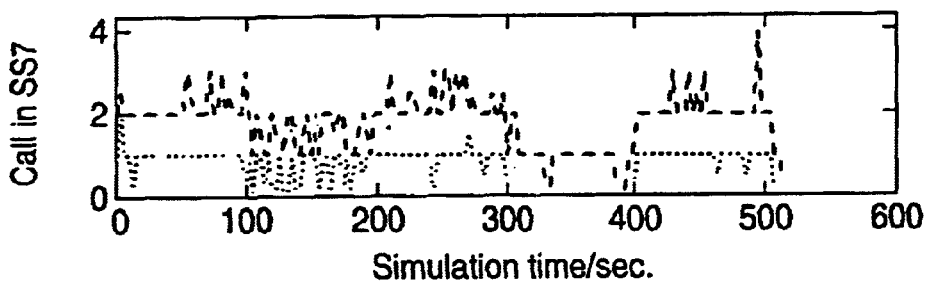
Figure 23J:
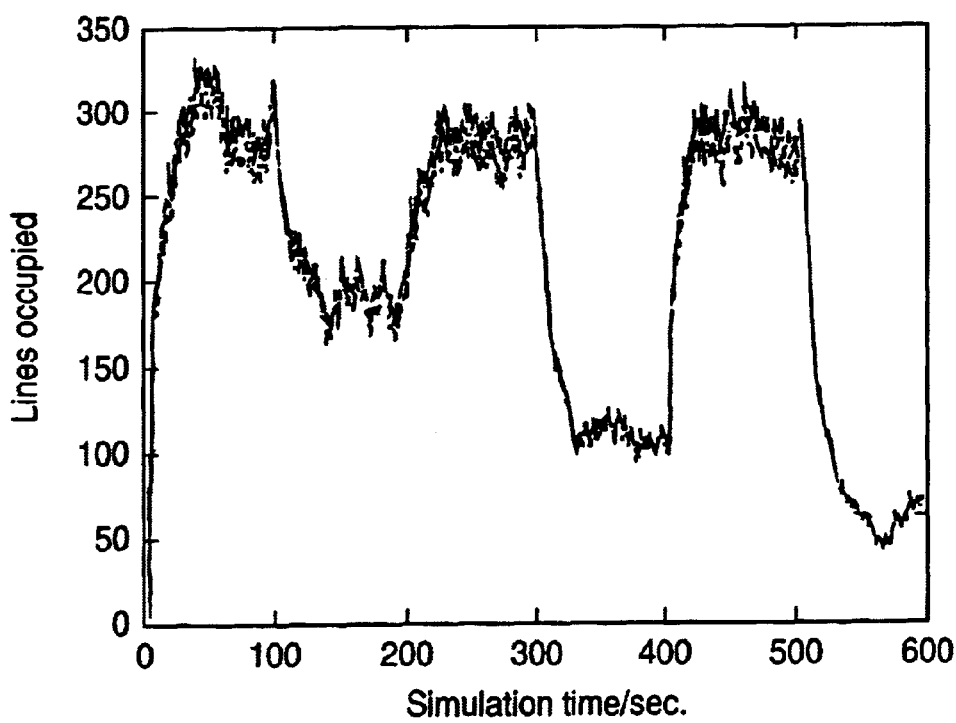

FIG. 22a shows that the generated traffic follows the set traffic volume up to time t=250 seconds, with the generated traffic volume being distorted by statistical fluctuations. At time t=250 seconds, the generated traffic volume, i.e., the number of messages generated by the traffic simulator that reaches the IN, drops significantly compared to the preset volume. This can be seen in FIG. 22j. All lines leading to the network are occupied at time t=250 seconds, so that only a small portion of the calls can lead to an IN event.

Without manipulating the overload protection simulator, the SCP response time increases significantly in the simulation shown in FIG. 22 as soon as the limit of 30 calls per second is exceeded. The number of calls in the SCP and the SCP queue length also increase significantly. As soon as the volume drops below this limit value of 30 calls per second, the SCP is able to process the waiting messages so that the delay time and also the queue length decrease. The time needed to process the messages in the central signaling system fluctuates by only 0.02 seconds in spite of the different traffic volumes.

FIG. 23 shows a simulation using the same set traffic volume as in FIG. 22, but in this case with the overload protection simulator activated. A maximum traffic volume of 30 calls per second was set for the overload protection simulator. FIG. 23a shows that the generated traffic volume is limited to this average of 30 calls per second. As shown in FIG. 23b, the SCP response time is therefore reduced to a value of around 0.4 to 0.5 seconds, which corresponds to the SCP response times at a constant traffic volume of 30 calls per second shown by the example in FIG. 21. The response times are therefore lower by a factor of 100 compared to the example shown in FIG. 22.

In all stages of planning and operating an intelligent communication network, the IN simulator according to the present invention is a useful tool for testing network performance, adapting it to certain specifications, and locating weak points. Due to the great flexibility of the simulation modules, the simulator can be easily adapted to given as well as future realities. Through comparison to simulated values and the parameters on which the simulation is based, the configuration of the real intelligent network can be selected to achieve the highest possible IN efficiency under the given basic conditions. This greatly reduces the costs of operating and planning intelligent networks, since the IN simulation can be used to determine an optimum configuration for the intelligent network and its components and apply it directly to real situations without having to waste costly experimentation time in the real IN. The IN simulator is a suitable tool for determining management parameters that can, for example, establish a stable basis for the problematic overload protection mechanisms. The simulation results also make it possible to develop and test general global or node-specific management functions that can be implemented and used more effectively than the overload protection mechanisms used up to now.

List of Reference Numbers

| | |
|---|---|
| Exchange | 101 |
| SSP | 102 |
| STP and SRP | 103 |
| SCP input processor | 104 |
| Telephone B channels | 105 |
| SS7 channels | 106, 107, 108 |
| SCP | 109 |
| Traffic simulator | 201, 301, 401, 1902 |
| SCP simulator | 202, 302, 402 |
| SS7 simulator | 303, 403, 503 |
| Transfer files | 203, 204, 304, 305, 306, 307, 406–409, 2001 |
| SCP output file | 205, 308, 423 |
| Traffic output file | 206, 309 |
| SS7 output file | 310 |

-continued

| | |
|---|---|
| SCP input file | 207, 311, 416 |
| Traffic input file | 208, 209, 210, 211, 212, 312–316, 411–414 |
| SS7 input file | 317, 415 |
| Overload protection simulator | 404, 502, 1903, 2002 |
| User interface | 410 |
| Log files | 417–420 |
| File name file | 421 |
| Overload protection input file | 422 |
| "Black box" | 501 |
| CPU | 1201, 1301, 1401, 1402, 1403, 1404 |
| LAN (for connection to the SS7) | 1202, 1203 |
| Service-specific queues | 1204, 1205, 1206, 1207, 1410, 1411 |
| IN message/event | 1208 |
| Queue for non-executable processes | 1209, 1306 |
| Priority queue (for activated, executable processes) | 1210, 1407 |
| Process-specific queue | 1302, 1303, 1304, 1305, 1601, 1602, 1603 |
| Process routine | 1307–1310, 1408, 1409, 1413–1416, 1604, 1605, 1606, 1704–1707 |
| ST2000 front-end system | 1405 |
| Counter | 1406 |
| "Wait event" | 1412 |
| SS7 user layer | 1501, 1701 |
| TCAP layer | 1502, 1702 |
| SCCP layer | 1503, 1703, 1607 |
| MTP layer | 1504, 1505, 1506, 1608, 1609 |
| Online simulator | 405, 1901 |

What is claimed is:

1. A simulator for simulating an intelligent network, the intelligent network including at least one service switching point to which a call having an intelligent network specific telephone number is switched, a service control point which provides the at least one service switching point with information on how to process the call, and a signal system no. 7 (SS7) handling dialog between the at least one service switching point and the service control point, the simulator comprising:

a traffic simulator generating intelligent network event sequences according to rules of traffic theory;

a service control point simulator providing event-oriented simulation of the service control point using first process models;

a first arrangement for exchanging data between the traffic simulator and the service control point simulator; and a second arrangement for entering and storing network configuration, a communication service specification and simulation parameters, the second arrangement transferring data from the network configuration, communication service specification and the simulation parameters to at least one of the traffic simulator and the service control point simulator.

2. The simulator according to claim 1, further comprising:

an SS7 simulator providing event-oriented simulation of the SS7 as a function of at least one of: i) a second process model, and ii) a constant delay time.

3. The simulator according to claim 2, wherein the SS7 simulator simulates the at least one service switching point, signal relay point components, and a link to the service control point using process models, the SS7 simulator further simulating SS7 signaling channels between the at least one service switching point, the signal relay point components, and the service control point using the constant delay time.

4. The simulator according to claim 2, further comprising:

an overload protection simulator simulating overprotection mechanisms, the overload protection simulator simulating a number of events processed by at least one of the traffic simulator, the service control point simulator and the SS7 simulator, as a function of a load on at least one of the traffic simulator, the service control point simulator and the SS7 simulator.

5. The simulator according to claim 4, wherein the overprotection simulator simulates the number events processed as a function of queue length and as a function of user-definable parameters.

6. The simulator according to claim 4, wherein the overload protection simulator controls a volume of events one of generated and forwarded by the traffic simulator as a function of a load on the service control point simulator.

7. The simulator according to claim 4, further including user definable parameters for establishing at least one of the network configuration and the communication service specification, the user definable parameters being entered via a user interface and being stored in at least one configuration file, the user definable parameters being transferred to at least one of the traffic simulator, service control point simulation, the SS7 simulation and the overload protection simulator at a beginning of simulation;

wherein, for the SS7 simulator, the user definable parameters include at least one of: a count of the at least one service switching point, a number of signaling channels between a signal relay point and one of the service control point and the at least one service switching point, delays between the signal relay point and at least one the service control point at the at least one service switching point, at least one of a type and a number of processors used in layers of the SS7, processes and process times running on the processors used in the layers of the SS7, and delays between the processes running on the processors used in the layers of the SS7;

wherein, for the service control point simulator, the user definable parameters include at least one of: at least one of a type and a number of processors in the service control point, a type of assignment between and a processor of the service control point, at least one of a type, duration and priority of processes running in the service control point, a type of conversion from an intelligent network event to a service control point sequence, and a number of process incarnations per processor in the service control point;

wherein, for the traffic simulator, the user definable parameters include at least one of general parameters, service-specific parameters and parameters for a televoting service per selection option, the general parameters including at least one of: a time until timeout, a rerouting delay time, a number of lines to/from the at least one service switching point, a follow-up call probability, a maximum number of follow-up calls, an average/maximum recorded announcement duration, a number of attendant consoles, the service-specific parameters including at least one of: at least one of an average call and recorded announcement duration, a maximum recorded announcement duration, a number of attendant consoles, a recorded announcement probability, a rerouting probability, and a number of lines, the parameters for the televoting service per selection including at least one of: a start time, an end time for follow-up calls, a destination value, and a number of destination values; and wherein, for the overload protection simulation, the user definable parameters include at least one of: a critical service control point queue, a critical service control point utilization, and a duration of call protection at the at least one service switching point.

8. The simulator according to claim 7, wherein the SS7 layers include at least one of MTP1, MTP2, MTP3, SCCP and TCAP.

9. The simulator according to claim 1, wherein the traffic simulator generates the intelligent network event sequence as a function of user-definable settings stored in at least one file and transferred to the traffic simulator at a beginning of simulation, the user-definable settings including:

information on a variation over time of an average traffic volume in calls per time unit per at least one of: i) intelligent network service, ii) subscriber, and iii) service switching point;

information on probabilities relating to a further progress of a call after receiving a processing information message from the service control point, including at least one of: i) at least one of an average call duration and a recorded announcement duration, after a call is successfully switched, and ii) probabilities of unsuccessful switching; and information on probabilities related to a further progress of a call prior to receiving a processing information message from the service control point, including at least one of a timeout and caller hang ups;

wherein the intelligent network event sequences are generated by generating a first event for each simulation interval per at least one of: i) intelligent network service, ii) subscriber, and iii) service switching point, assuming a Poisson distribution, and as a function of the instantaneous average traffic volume, and by entering the first event in an event calendar as a function of generation time;

wherein follow-up events are assigned to the first event as a function of service control point parameters, and are entered into the event calendar as a function of generation time; and wherein the event calendar contains all first and follow-up events in chronological order.

10. The simulator according to claim 1, wherein time stamps are logged for each first event of the intelligent network event sequences generated by the traffic simulator upon passing through the simulator, the time stamps including a time stamp t1 corresponding to a time at which a message corresponding to each first event is generated in the at least one service switching point, and a time stamp t4 after each first event is processed by the service control point simulator.

11. The simulator according to claim 10, wherein the first event is a call.

12. The simulator according to claim 2, wherein time stamps are logged for each first event of the intelligent network event sequences generated by the traffic simulator upon passing through the simulator, the time stamps including a time stamp t1 corresponding to a time at which a message corresponding to each first event is generated in the at least one service switching point, a time stamp t2, after each first event from the traffic simulator is processed by the SS7 simulator, a time stamp t3 after a message from the SS7 simulator corresponding to each first event is processed by the service control point simulator, and a time stamp t4 after a message from the service control point simulator corresponding to each first event is processed by the SS7 simulator.

13. The simulator according to claim 1, further comprising:

a first transfer file storing the intelligent network event sequences generated by the traffic simulator, the first transfer file being transferred to and processed by the service control point simulator, with time t1 being stored for each event in the intelligent network event sequences, t1 corresponding to a time at which a message is generated in the at least one service switching point; and a second transfer file storing events processed by the service control point simulator, the second transfer file being transferred to the traffic simulator, with time t4 being stored for each of the events processed by the service control point simulator, t4 corresponding to a time at which a follow-up message is generated in service control point and a time at which the follow-up message arrived in the at least one service switching point.

14. The simulator according to claim 2, further comprising:

a first transfer file storing the intelligent network event sequences generated by the traffic simulator, a time t1 corresponding to a time at which a message is generated in the at least one service switching point being stored for each event in the intelligent network event sequences, the first transfer file being transferred to and processed by the SS7 simulator;

a second transfer file storing events processed by the SS7, a processing time t2 corresponding to a time at which a message arrives in the service control point being stored for each of the events processed by the SS7, the second transfer file being transferred to the service control point simulator;

a third transfer file storing events processed by the service control point simulator, a time t3 corresponding to a time at which a follow-up message is generated in the at least one service control point being stored for each of the events processed by the service control point simulator, the third transfer file being transferred to the SS7 simulator; and a fourth transfer file storing the events processed by the SS7 simulator, a time t4 corresponding to a time at which a message arrives in the at least one service switch point being stored for each of the events processed by the SS7 simulator, the fourth transfer file being transferred to the traffic simulator.

15. The simulator according to claim 13, wherein the intelligent network sequences generated by the traffic simulator are entered in the first transfer file and the events processed by the service control point simulator are entered in the second transfer file, and are transferred to the service control point simulator and the traffic simulator, respectively, multiple times in sequence, at least one of a constant service control point delay time and an SS7 delay time being assumed in a first pass of the transfer of the first transfer file to the service control point simulator for generating follow-up events by the traffic simulator, the delay times being modified in subsequent cycles as a function of response times determined as a function of the second transfer file after passing though the service control point simulator.

16. The simulator according to claim 1, further comprising:

a first local event calendar assigned to traffic simulator in which events to be processed by the traffic simulator are entered.

17. The simulator according to claim 16, further comprising:
a second local event calendar assigned to the SS7 simulator in which events to be processed by the SS7 simulator are entered as a function of one of: i) time stamps of the events to be processed by the SS7 simulator, and ii) priorities of the events to be processed by the SS7 simulator.

18. The simulator according to claim 17, further comprising:
a third local event calendar assigned to the service control point simulator in which events to be processed by the service control point simulator are entered as a function of i) time stamps of the events to be processed by the service control point simulator, and ii) priorities of the events to be processed by the service control point simulator.

19. The simulator according to 16, wherein the local event calendar has multiple nested queues, each of the queues including events to be processed by one sub-component of the traffic simulator.

20. The simulator according to claim 18, further comprising:
a global event calendar including events corresponding to messages between the service switching point and the service control point, and reference to at least one of: i) the first local event calender of the traffic simulator, ii) the second local event calendar of the SS7 simulator, and iii) the third local event calendar of the service control point simulator in the form of a shared queue, the events being entered in the global event calendar as a function of at least one of time and priority.

21. The simulator according to claim 20, wherein randomly-generated call-independent events are stored in the global event calendar and processed by one of traffic simulator, the SS7 simulator and the service control point simulator, to take into account call-independent processes within network components.

22. The simulator according to claim 21, wherein the call-independent events includes operating system interventions within processors of the service control point.

23. The simulator according to claim 20, further comprising:
a simulation clock assigned to each of the traffic simulator, the SS7 simulator and the service control point simulator, the simulation clock stopping during processing of an event from at least one of the global event calendar, the first local event calendar, the second local event calendar, and the third local event calendar, wherein at the end of the processing, the simulation clock is moved forward to a time of the next event entered in the at least one of the global event calendar, the first local event calendar, the second local event calendar and the third local event calendar.

24. The simulator according to claim 20, further comprising:
at least one internal user-definable event assigned to one of an external message and an external event, the at least one internal user-definable event being entered in at least one of the first local event calendar, the second local event calendar and the third local event calendar, each at least one internal user-definable event having a predetermined duration.

25. The simulator according to claim 24, further comprising:
an internal event entered in the global event calendar, the simulation module being invoked by the internal event, the internal event referring to at least one of the first local event calendar, the second local event calendar and the third local event calendar for processing a next internal event; and
an internal simulation clock, the internal simulation clock being reset after processing the internal event;
wherein, if a further event belonging to a process chain is provided, a reference to the further event is entered in the global event calendar along with a first instantaneous internal simulation time; and
wherein, if an event currently being processes is a last event in a process chain, an external event is generated by the simulation module and entered in the global event calendar along with a second instantaneous internal simulation time.

26. The simulator according to claim 1, wherein the traffic simulator simulates ordinary telephone traffic.

27. The simulator according to claim 2, further comprising:
an output file storing at least one network quantity with a corresponding simulation time, the at least one network quantity including at least one of: i) a number of calls generated by the traffic simulator and arriving at the intelligent network per time unit, ii) a number of messages being processed by the SS7 simulator that are destined for the service control point simulator, iii) a number of message in the service control point simulator and iv) a number of messages being processed by the SS7 simulator that are destined for the traffic simulator.

28. The simulator according to claim 1, further comprising:
an output file, the service control point simulator storing statistical quantities and corresponding simulation times in the output at one of regular intervals and presettable simulation times, the statistical quantities including at least one of CPU utilization, queue length, number of processes executed per time unit, the statistical quantities being at least one of: i) separated by CPU number, ii) averaged over all CPUs, and iii) separated by minimum and maximum values of a CPU.

29. The simulator according to claim 1, further comprising:
a file, service switching point-specific number of occupied lines at least one of: i) to an exchange, and ii) in the intelligent network, being logged to the file at one of: i) regular intervals, and ii) at presettable simulation times.

30. The simulator according to claim 1, further comprising:
a user interface used as an input element for generating a simulation by entering simulation parameters, the user interface managing configuration files and displaying simulation results in graphical form.

31. The simulator according to claim 1, further comprising:
an event-oriented simulator of additional network components, the additional components including at least one of a service management system and an intelligent peripheral.

* * * * *